(12) United States Patent
Bang et al.

(10) Patent No.: US 10,805,883 B2
(45) Date of Patent: Oct. 13, 2020

(54) METHOD FOR TRANSMITTING/RECEIVING SIGNAL BASED ON PS MODE IN WLAN SYSTEM AND APPARATUS THEREOF

(71) Applicant: LG ELECTRONICS INC., Seoul (KR)

(72) Inventors: Saehee Bang, Seoul (KR); Jinmin Kim, Seoul (KR); Kiseon Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/485,003

(22) PCT Filed: Jul. 10, 2019

(86) PCT No.: PCT/KR2019/008485
§ 371 (c)(1),
(2) Date: Aug. 9, 2019

(87) PCT Pub. No.: WO2020/013597
PCT Pub. Date: Jan. 16, 2020

(65) Prior Publication Data
US 2020/0092812 A1    Mar. 19, 2020

Related U.S. Application Data

(60) Provisional application No. 62/696,303, filed on Jul. 10, 2018, provisional application No. 62/696,332, (Continued)

(51) Int. Cl.
*H04W 84/12* (2009.01)
*H04W 52/02* (2009.01)
(Continued)

(52) U.S. Cl.
CPC ...... *H04W 52/0229* (2013.01); *H04B 7/0617* (2013.01); *H04L 5/14* (2013.01);
(Continued)

(58) Field of Classification Search
CPC ..................................................... H04W 76/28
See application file for complete search history.

(56) References Cited

U.S. PATENT DOCUMENTS

2017/0352954 A1 * 12/2017 Abdallah ............. H04B 7/0695
2019/0068255 A1 *  2/2019 Bolotin ................ H04L 1/0009

FOREIGN PATENT DOCUMENTS

KR     20140097104 A  *  8/2014  ........ H04W 52/0206
KR     1020140121906       10/2014
(Continued)

OTHER PUBLICATIONS

PCT International Application No. PCT/KR2019/008485, International Search Report dated Oct. 17, 2019, 3 pages.
(Continued)

*Primary Examiner* — Sulaiman Nooristany
(74) *Attorney, Agent, or Firm* — Lee Hong Degerman Kang Waimey

(57) ABSTRACT

Provided are a method and apparatus for transmitting/receiving a signal based on a power saving (PS) mode in a wireless local area network (WLAN) system. Specifically, a first station (STA) determines the PS mode in a time division duplex (TDD)-based service period (SP), and transmit the signal to the second STA or receive the signal from the second STA based on the PS mode. The SP includes a plurality of TDD slots. The plurality of TDD slots include an unassigned TDD slot, an assigned Tx TDD slot, and an assigned Rx TDD slot. In the unassigned TDD slot, a PS mode of the first STA is determined as a doze state, and a PS mode of the second STA is determined an awake or doze
(Continued)

state. In the assigned Rx TDD slot, the PS mode of the first STA is determined as the awake state, and the PS mode of the second STA is determined as the awake state. In the assigned Tx TDD slot, the PS mode of the first STA is determined as the awake or doze state, and the PS mode of the second STA is determined as the awake state.

15 Claims, 27 Drawing Sheets

Related U.S. Application Data filed on Jul. 10, 2018, provisional application No. 62/696,780, filed on Jul. 11, 2018.

(51) Int. Cl.
    *H04W 76/28*     (2018.01)
    *H04B 7/06*     (2006.01)
    *H04L 5/14*     (2006.01)
    *H04W 72/04*     (2009.01)
    *H04B 7/0413*     (2017.01)

(52) U.S. Cl.
    CPC ... *H04W 52/0216* (2013.01); *H04W 72/0446* (2013.01); *H04W 76/28* (2018.02); *H04B 7/0413* (2013.01); *H04W 84/12* (2013.01)

(56) References Cited

FOREIGN PATENT DOCUMENTS

| KR | 1020150013514 | | 2/2015 | |
| --- | --- | --- | --- | --- |
| KR | 20160102750 | A * | 8/2016 | ........ H04W 52/0235 |
| KR | 20180044294 | A * | 5/2018 | ........ H04W 52/0206 |
| WO | 2013077653 | | 5/2013 | |
| WO | WO-2013077653 | A1 * | 5/2013 | ........ H04W 52/0206 |
| WO | 2016195211 | | 12/2016 | |
| WO | WO-2016195211 | A1 * | 12/2016 | ............ H04W 52/02 |
| WO | 2017003062 | | 1/2017 | |

OTHER PUBLICATIONS

Bang, S. et al., "Power saving in TDD SP text", IEEE P802.11 Wireless LANs, doc.: IEEE 802.11-18/1173r2, Jul. 2018, 5 pages.

* cited by examiner

FIG. 9

| CH 1 | L-STF | L-CE | L-Header | ay Header A | ay STF | ay CE | ay Header B | ay payload |
|---|---|---|---|---|---|---|---|---|
| | GF-STF | GF-CE | | | | | | |
| CH 2 | L-STF | L-CE | L-Header | ay Header A | | | | |

(L: Legacy, GF: Gap Filling, ay: 802.11ay)

FIG. 17

| Element ID | Length | Element ID Extension | EDMG Allocation Control | Number of Allocations | Channel Allocations 1 | ... | Channel Allocations N |
|---|---|---|---|---|---|---|---|
| 1 | 1 | 1 | 1 | 1 | 5 or 20 | | 5 or 20 |

Octets:

FIG. 18

| Element ID | Length | Element ID Extension | Slot Structure Control | Slot Structure Start Time | TDD SP Block Duration | Slot Structure |
|---|---|---|---|---|---|---|
| 1 | 1 | 1 | 4 | 4 | 2 | M |

Octets:

METHOD FOR TRANSMITTING/RECEIVING SIGNAL BASED ON PS MODE IN WLAN SYSTEM AND APPARATUS THEREOF

CROSS-REFERENCE TO RELATED APPLICATIONS

This application is the National Stage filing under 35 U.S.C. 371 of International Application No. PCT/KR2019/008485, filed on Jul. 10, 2019, which claims the benefit of U.S. Provisional Application No. 62/696,303, filed on Jul. 10, 2018, 62/696,332, filed on Jul. 10, 2018, and 62/696,780, filed on Jul. 11, 2018, the contents of which are all hereby incorporated by reference herein in their entireties.

BACKGROUND OF THE INVENTION

Field of the Invention

The present specification relates to a scheme of transmitting/receiving a signal in a wireless local area network (WLAN) system, and more particularly, to a method and apparatus for transmitting/receiving a signal by setting a PS mode according to a TDD SP structure.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE INVENTION

The present specification proposes a method and apparatus for transmitting/receiving a signal by setting a PS mode according to a TDD SP structure in a wireless local area network (WLAN) system.

The present specification proposes a method and apparatus for transmitting/receiving a signal based on a power saving (PS) mode.

The present embodiment proposes a method of transmitting/receiving a signal by performing MIMO beamforming during a TDD-SP to achieve a transfer rate required in 802.11ay.

First, summarizing terminologies, a first station (STA) may correspond to a responder for performing beamforming, and a second STA may correspond to an initiator for performing beamforming. In addition, the first STA may be a non-AP STA or a non-PCP (Personal basic service set Control Point) STA or a PCP STA. MIMO beamforming described in the present embodiment is performed between the first STA and the second STA. In the presence of one first STA, single user (SU)-MIMO beamforming may be performed, and in the presence of a plurality of first STAs, multi-user (MU)-MIMO beamforming may be performed.

The first STA determines the PS mode in a service period (SP) based on a time division duplex (TDD).

The first STA transmits the signal to the second STA or receives the signal from the second STA based on the PS mode.

The SP includes a plurality of TDD slots.

The first STA may receive a beacon frame or an announce frame from the second STA.

The beacon frame or the announce frame may include a TDD slot structure element. The plurality of TDD slots may be determined by the TDD slot structure element.

The plurality of TDD slots include an unassigned TDD slot, an assigned Tx TDD slot, and an assigned Rx TDD slot. That is, the signal is not transmitted/received in the unassigned TDD slot. The signal may be received from the second STA in the assigned Rx TDD slot, and may be transmitted to the second STA in the assigned Tx TDD slot.

In the unassigned TDD slot, a PS mode of the first STA is determined as a doze state, and a PS mode of the second STA is determined as an awake or doze state. Since the unassigned TDD slot is not assigned to the first STA, the first STA (STA) is in the doze state, but the second STA (AP) may autonomously make a decision to become the awake state.

In the assigned Rx TDD slot, the PS mode of the first STA is determined as the awake state, and the PS mode of the second STA is determined as the awake state. In the assigned Rx TDD slot, the second STA (AP) has to send a signal to the first STA (STA), both the first and second STAs shall be in the awake state.

In the assigned Tx TDD slot, the PS mode of the first STA is determined as the awake or doze state, and the PS mode of the second STA is determined as the awake state.

If a signal to be transmitted by the first STA exists in the assigned Tx TDD slot, the PS mode of the first STA may be determined as the awake state, and the signal may be transmitted to the second STA in the assigned Tx TDD slot. If the signal to be transmitted by the first STA does not exist in the assigned Tx TDD slot, the PS mode of the first STA may be determined as the doze state. That is, since the first STA (STA) has to send a signal to the second STA (AP) in the assigned Tx TDD slot, the second STA shall be awake unconditionally. However, the first STA may become the awake state only if there is a signal to be sent, and may become the doze state if there is no signal to be sent.

In addition, the first STA may receive a TDD slot schedule element from the second STA. The assigned Tx TDD slot and the assigned Rx TDD slot may be determined by the TDD slot schedule element. The PS mode may be determined after the TDD slot schedule element is received.

The beacon frame or the announce frame and the signal may be transmitted/received within a beacon interval. The beacon interval may include a beacon header interval (BHI) and a data transfer interval (DTI).

The BHI may include a beacon transmission interval (BTI), association beamforming training (A-BFT), and an announcement transmission interval (ATI). The DTI may include at least one contention based access period (CBAP) and the SP. The beacon frame may be transmitted in the BTI. The announce frame may be transmitted in the ATI. Beamforming training between the first STA and the second STA may be performed in the A-BFT.

If the beacon interval is in the awake state, in the BHI, the PS mode of the first STA may be determined as the awake or doze state, and the PS mode of the second STA may be determined as the awake state. In addition, in the A-BFT, the PS mode of the first STA may be determined as the awake or doze state, and the PS mode of the second STA may be determined as the awake state. In addition, in the ATI, the PS mode of the first STA may be determined as the awake state, and the PS mode of the second STA may be determined as the awake state.

If the beacon interval is in the doze state, in the BHI, the PS mode of the first STA may not be defined (N/A), and the PS mode of the second STA may be determined as the awake or doze state. In the A-BFT, the PS mode of the first STA may not be defined (N/A), and the PS mode of the second STA may be determined as the awake or doze state. In the ATI, the PS mode of the first STA may be determined as the awake state, and the PS mode of the second STA may be determined as the awake state.

According to an embodiment proposed in the present specification, a power saving technique for controlling power in a slot other than an assigned slot and a slot for actually transmitting/receiving a signal is introduced for effective power saving management in a TDD SP structure. Therefore, power consumption caused by MIMO beamforming can be minimized.

BRIEF DESCRIPTION OF THE DRAWINGS

FIG. 9 is a diagram showing a PPDU structure that can be applied to the present invention.

FIG. 17 is a diagram showing an extended schedule element applicable to the present invention.

FIG. 18 is a diagram showing a TDD slot structure element applicable to the present invention.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System 1-1. General Wireless LAN (WLAN) System

Figure 1:
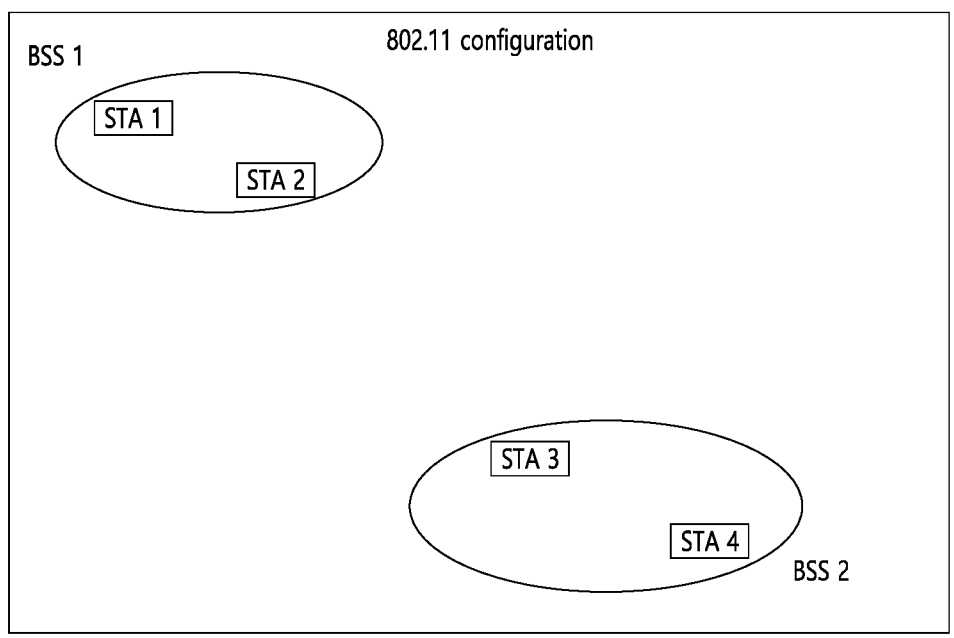
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
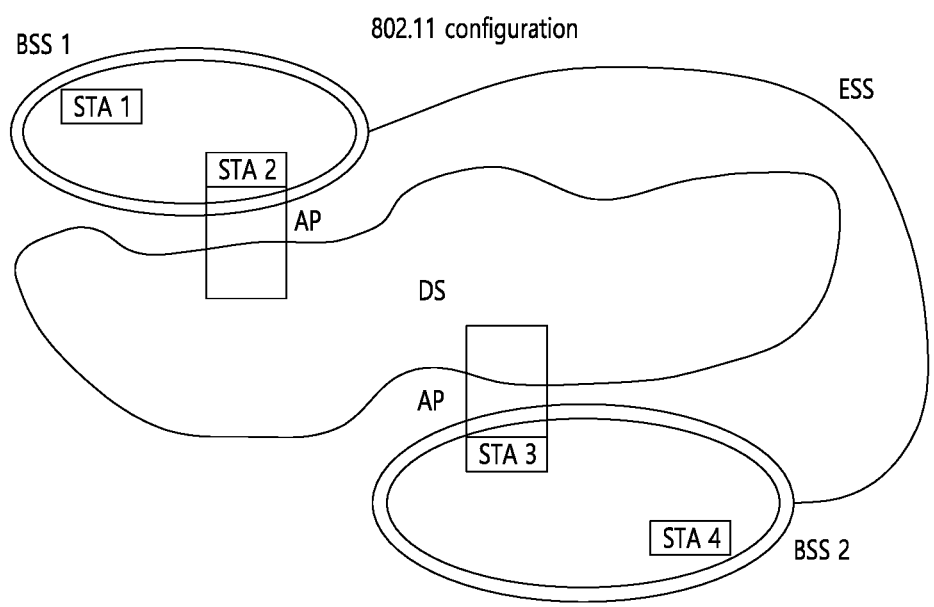
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
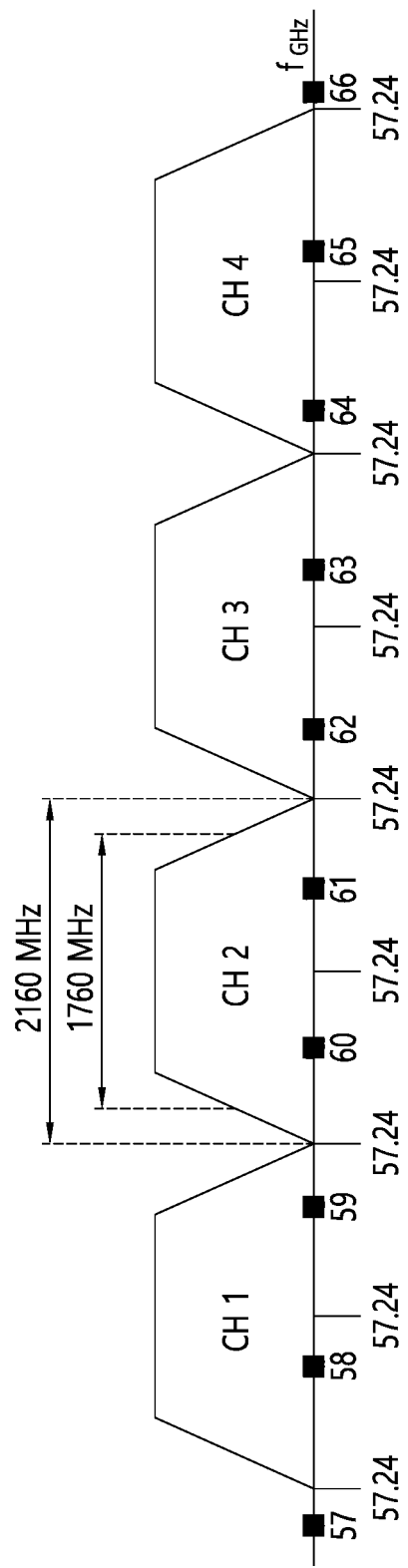
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz~66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present invention will not be limited to only one or more specific channels.

Figure 4:
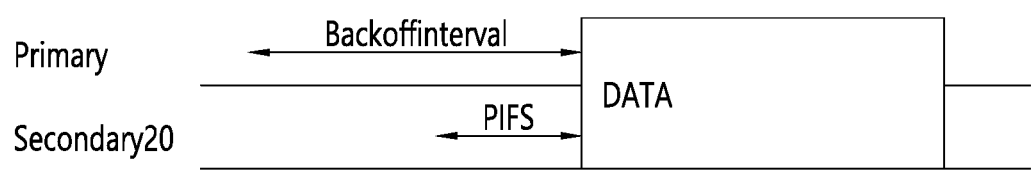
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
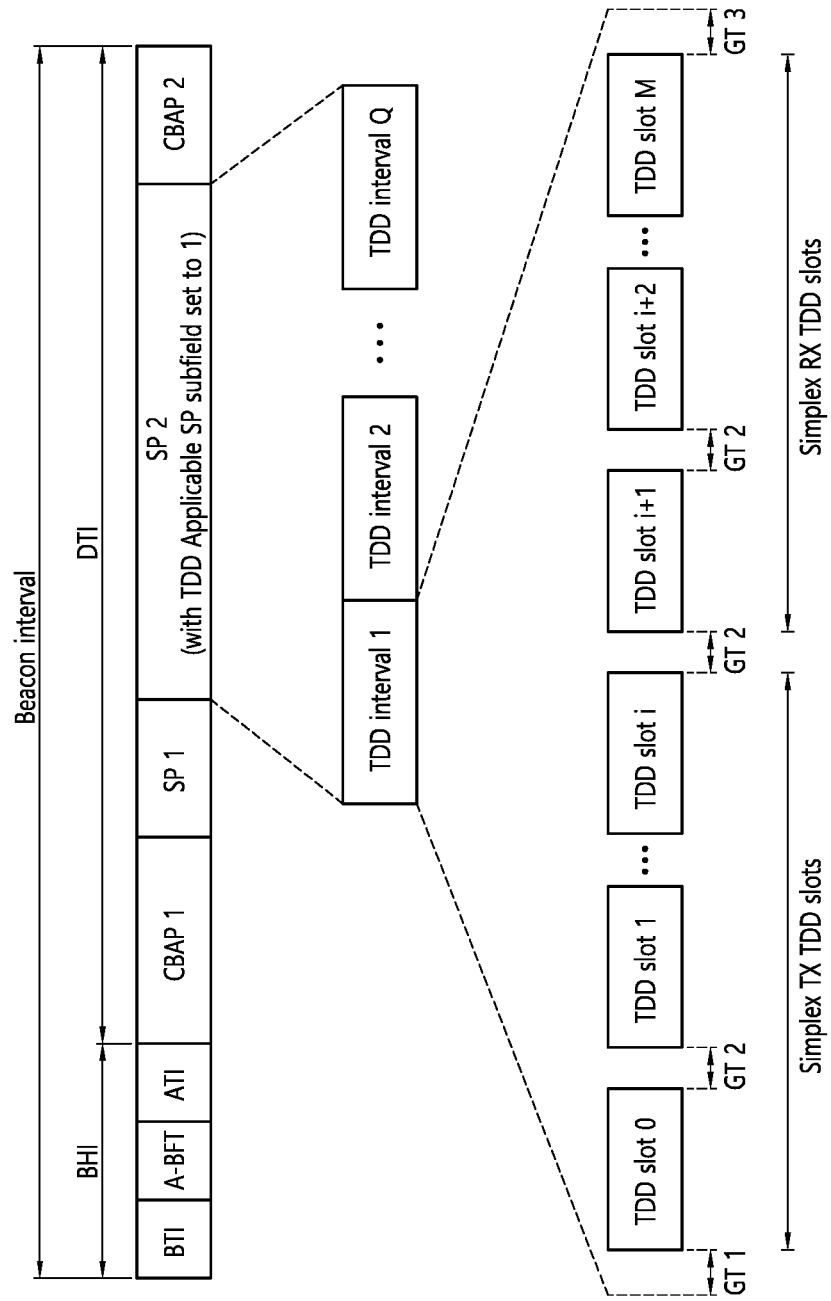
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present invention is not necessarily required to be limited only to this.

FIG. 5 shows a structure of a TDD service period (SP). The TDD SP consists of one or more consecutive and adjacent TDD intervals (TDD interval 1, TDD interval 2, ..., TDD interval Q) actualized by a TDD slot structure element. The TDD interval includes one or more TDD slots. Adjacent TDD slots shown in FIG. 5 shall be separated temporally by a guard time (GT) defined by the TDD slot structure element (according to FIG. 5, the slots are separated temporally by GT1, GT2, GT3). If all STA operations are identical, transmission and reception of the adjacent TDD slots allocated to the same STA pair may be continued between the adjacent TDD slots.

An STA which intends to transmit data through a beamforming operation is referred to as an initiator, and an STA which receives data transmitted from the initiator is referred to as a responder. According to FIG. 5, the initiator may transmit data (or a frame) to the responder in a TX TDD slot (TDD slot 0, TDD slot 1, ..., TDD slot i), and the responder may receive data (or a frame) from the initiator in an RX TDD slot (TDD slot i+1, TDD slot i+2, ..., TDD slot M).

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
| --- | --- | --- |
| Control PHY | 0 | |
| Single carrier PHY | 1 ... 12 | (low power SC PHY) |
| (SC PHY) | 25 ... 31 | |
| OFDM PHY | 13 ... 24 | |

Figure 6:
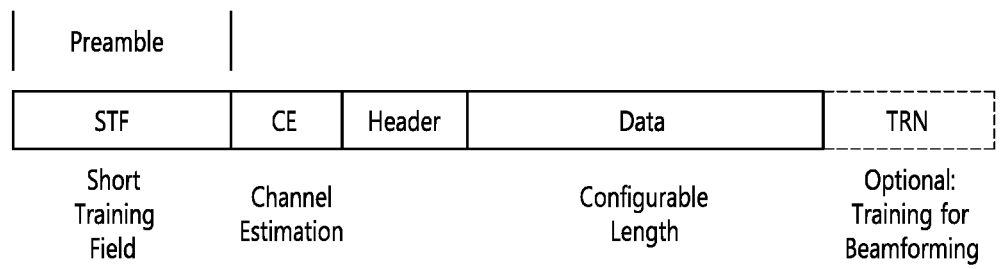
FIG. 6 is a diagram describing a physical configuration of a legacy radio frame.

Such modulation modes may be used for satisfying different requirements (e.g., high throughput or stability). Depending upon the system, among the modulation modes presented above, only some of the modulation modes may be supported. FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
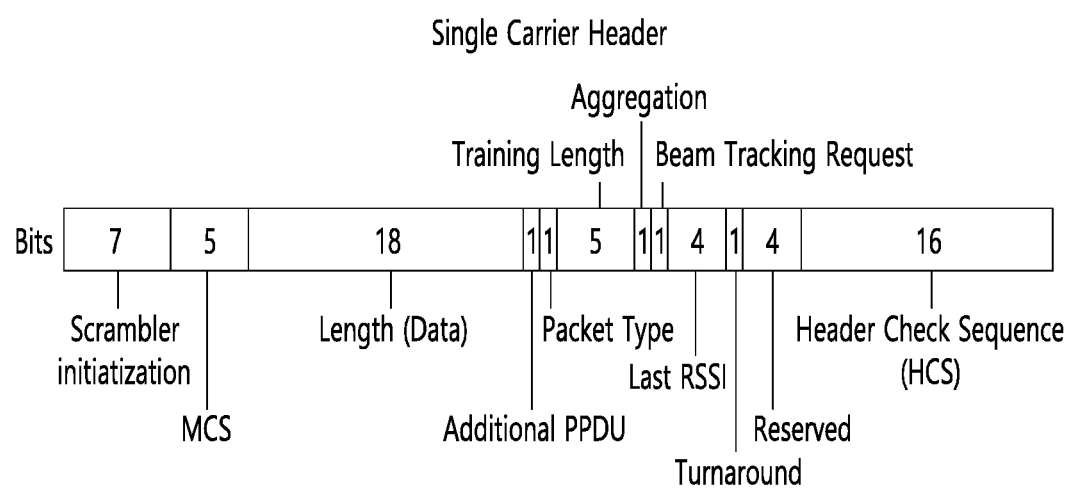
FIG. 7 and FIG. 8 are diagrams describing a configuration of a header field of the radio frame shown in FIG. 6.
Figure 8:
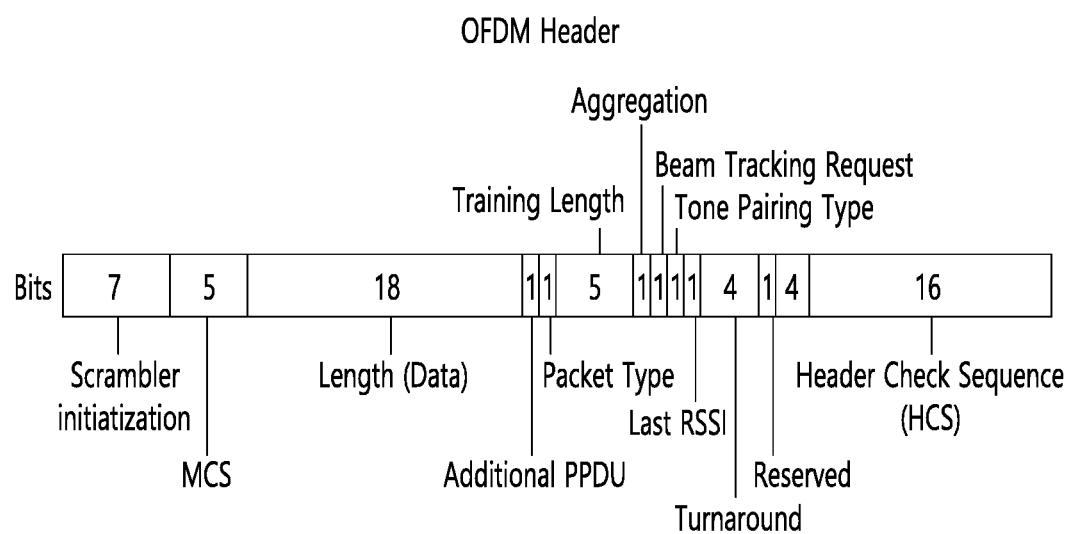

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. The header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
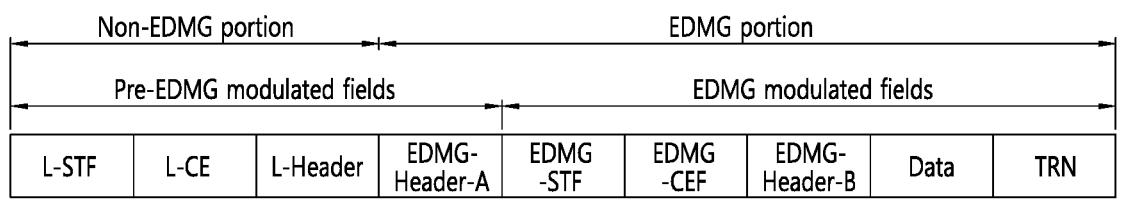
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

3. Beamforming Procedure that is Applicable to the Present Invention

As described above, methods such as channel bonding, channel aggregation, FDMA, and so on, which transmit data by using multiple channels at the same time may be applied in the 11ay system that can apply the present invention. Most particularly, since the 11ay system that can apply the present invention uses signals of a high frequency band, beamforming operation may be applied in order to transmit and/or receive signals at a high reliability level.

However, in the related art 11ad system, a beamforming method for one channel is only disclosed, and there is no implication on any beamforming method that can be applied for multiple channels. Accordingly, the present invention proposes a beamforming procedure that is applicable to a data transmission method being performing through multiple channels (e g, channel bonding, channel aggregation, FDMA, and so on) according to the 11ay system.

More specifically, hereinafter a method of performing beamforming for only one channel (Section 3.1.) and a method of performing beamforming for multiple continuous or non-continuous channels (Section 3.2.), which are performed by the STA before the data transmission process in order to perform the data transmission through beamforming, will each be described in detail.

3.1. Performing Beamforming for Only One Channel

Figure 11:
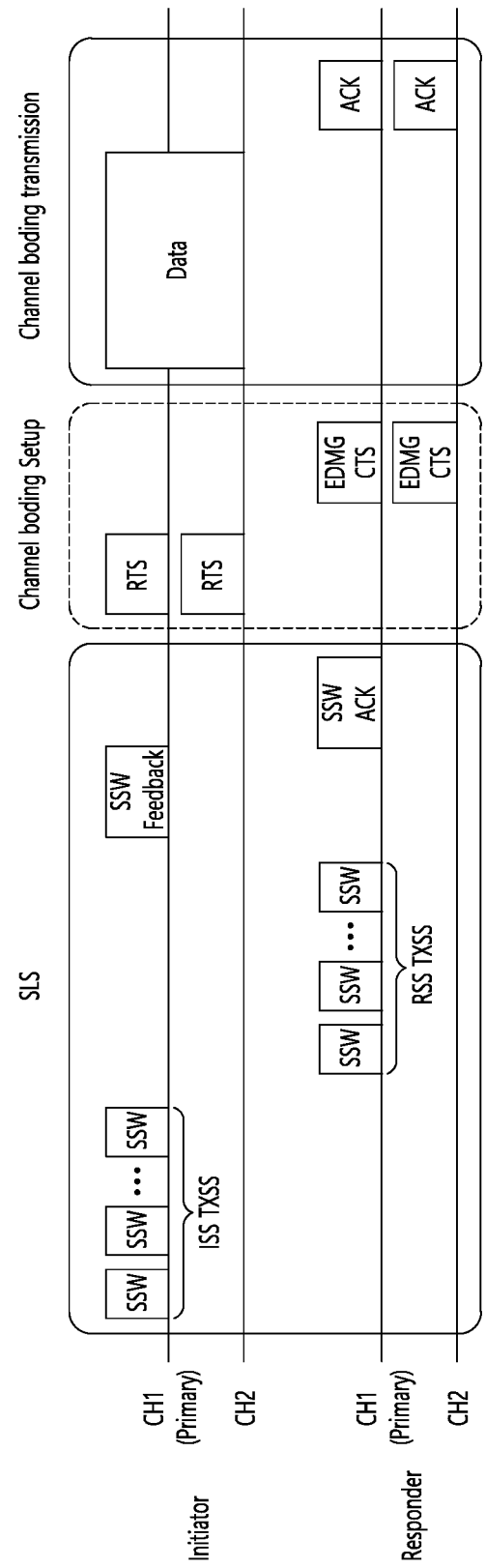
FIG. 11 is a diagram showing an operation for performing beamforming on one channel according to an exemplary embodiment of the present invention.

FIG. 11 is a diagram showing an operation for performing beamforming on one channel according to an exemplary embodiment of the present invention. Referring to FIG. 11, an STA that intends to transmit data through the beamforming operation is referred to as an initiator, and an STA that receives the data from the initiator is referred to as a responder. Also, although only a total of 2 channels (e.g., CH1, CH2) are shown in FIG. 11, the configuration of the present invention may also be extendedly applied to channel bonding, channel aggregation, and so on, through 3 or more channels.

As shown in FIG. 11, the beamforming procedure according to an exemplary embodiment of the present invention may be configured of a sector level sweep (SLS) phase, a channel bonding setup phase, and a channel bonding transmission phase. Hereinafter, the characteristics of each phase will be described in detail.

3.1.1. SLS Phase

In a 60 GHz band supporting the 11ay system, which can apply the present invention, in order to deliver data, control information, and so on, at a high reliability level, a directional transmission method, and not an omni transmission method, may be applied.

As a process for performing such application, the STAs that intend to transmit and/or receive data may be capable of knowing a Tx or Rx best sector for the initiator and the responder through the SLS process.

For a more detailed description of the above, configurations that are applicable to the SLS phase will hereinafter be described in detail with reference to the accompanying drawing(s).

Figure 12:
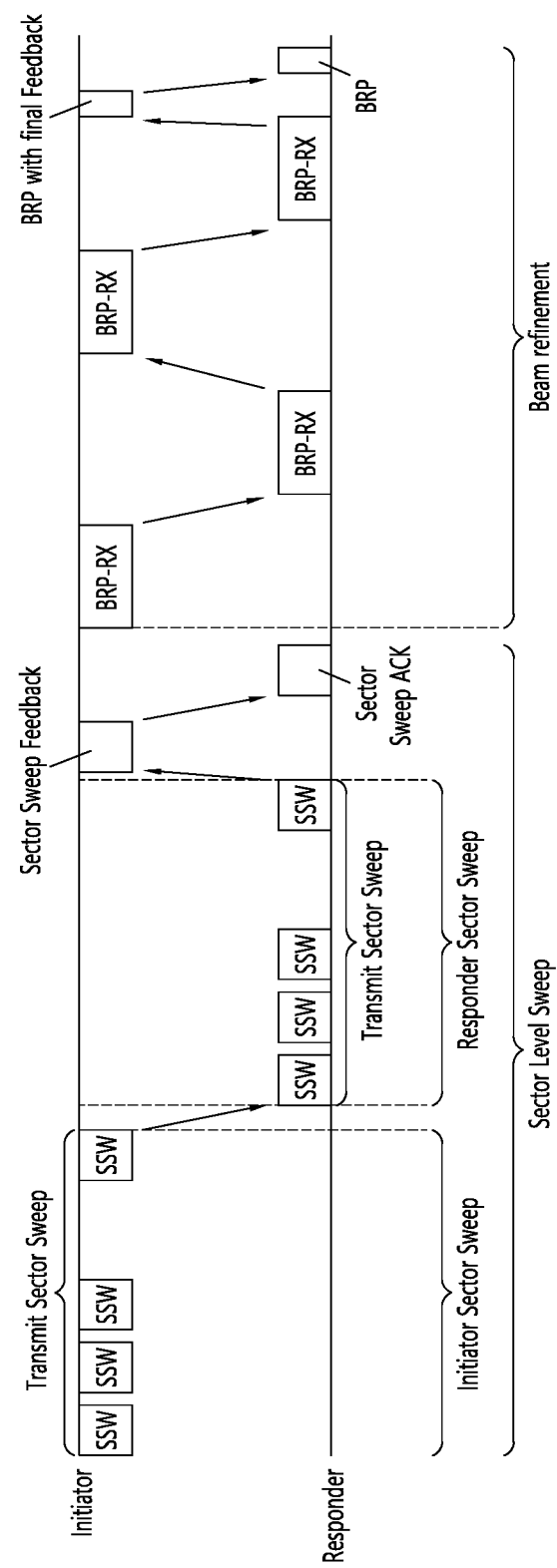
FIG. 12 shows an example of a beamforming training procedure that can be applied to the present invention.

FIG. 12 shows an example of a beamforming training procedure that can be applied to the present invention.

In a BF training that is generated during an Association BeamForming Training (A-BFT) allocation, the AP or PCP/AP becomes the initiator, and the non-AP and non-PCP/AP STA becomes the responder. In a BF training that is generated during an SP allocation, a source (EDMG) STA of the SP becomes the initiator, and a destination STA of the SP becomes the responder. In a BF training that is generated during a Transmission Opportunity (TXOP) allocation, a TXOP holder becomes the initiator, and a TXOP responder becomes the responder.

A link from the initiator to the responder is referred to as an initiator link, and a link from the responder to the initiator is referred to as a responder link.

The BF training is initiated along with the Sector Level Sweep (SLS) from the initiator. An object of the SLS phase is to allow communication to be established between two STAs in a control PHY layer or a higher MCS. Most particularly, the SLS phase provides only the transmission of the BF training.

Additionally, if a request is made by the initiator or the responder, a Beam Refinement Protocol or Beam Refinement Phase (BRP) may follow the SLS phase.

An object of the BRP phase is to enable iterative refinement of an Antenna Weight Vector (AWV) of all transmitter and receivers in all STAs. Among the STAs participating in the beam training, if one STA chooses to use only one transmission antenna pattern, reception training may be performed as part of the SLS phase.

As a more detailed description of the SLS phase, the SLS phase may include four elements listed below: an Initiator Sector Sweep (ISS) for training an initiator link, a Responder Sector Sweep (RSS) for training a responder link, a SSW feedback, and a SSW ACK.

The initiator initiates the SLS phase by transmitting the frame(s) of the ISS.

The responder does not initiate the transmission of the frame(s) of the RSS before the ISS is successfully completed. However, a case where the ISS is generated during the BTI may be an exemption.

The initiator does not initiate the SSW feedback before the RSS phase is successfully completed. However, a case where the RSS is generated within the A-BFT may be an exemption. The responder does not initiate the SSW ACK of the initiator during the A-BFT.

The responder initiates the SSW ACK of the initiator immediately after successfully completing the SSW feedback of the initiator.

During the SLS phase, the BF frame that is transmitted by the initiator may include a (EDMG) beacon frame, a SSW frame, and a SSW feedback frame. During the SLS phase, the BF frame that is transmitted by the responder may include a SSW frame and a SSW-ACK frame.

During the SLS, if each of the initiator and the responder executes the Transmit Sector Sweep (TXSS), at the end of the SLS phase, each of the initiator and the responder possesses its own transmit sector. If the ISS or RSS employs (or uses) a receive sector sweep, each of the responder or initiator possesses its own receive sector.

The STA does not change (or vary) the transmit power (or transport power) during the sector sweep.

Figure 13:
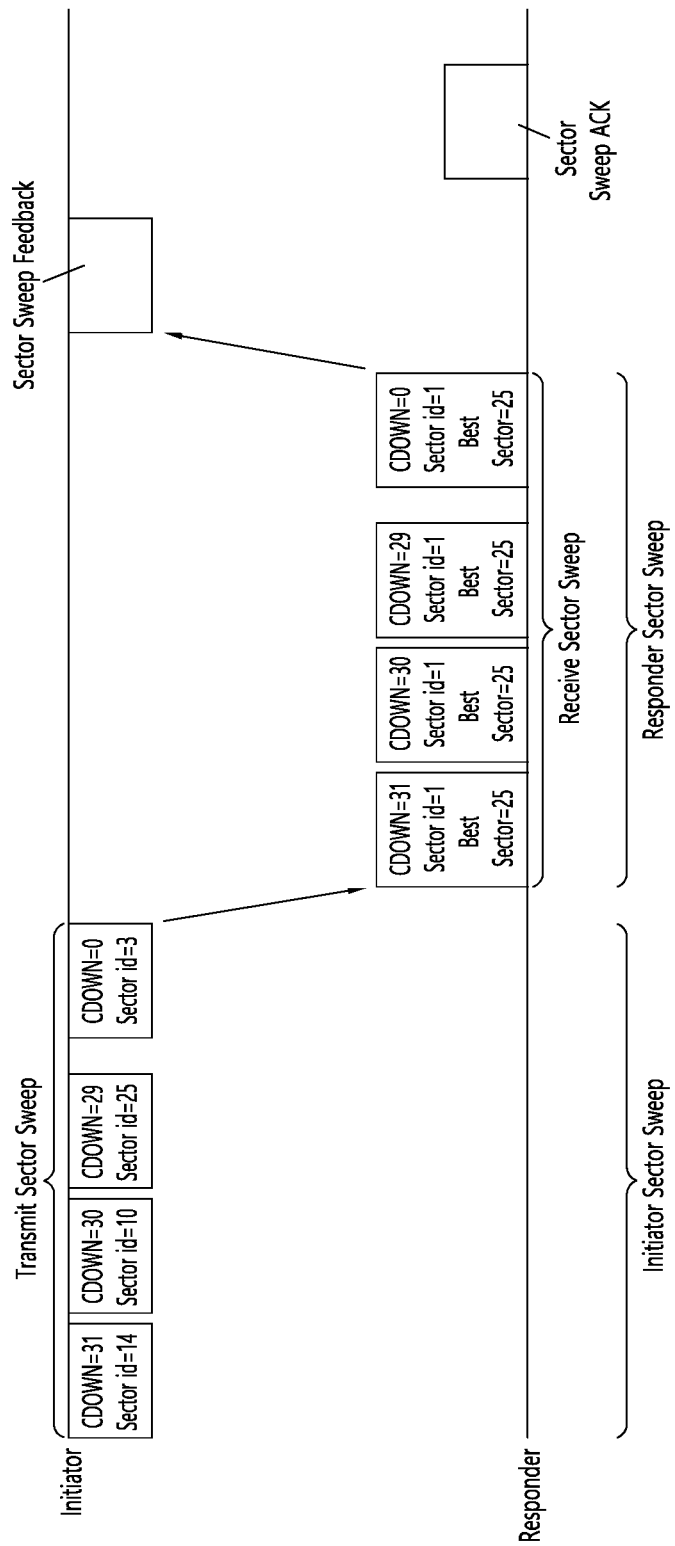
FIG. 13 and FIG. 14 is a diagram showing examples of a Sector Level Sweep (SLS) phase.
Figure 14:
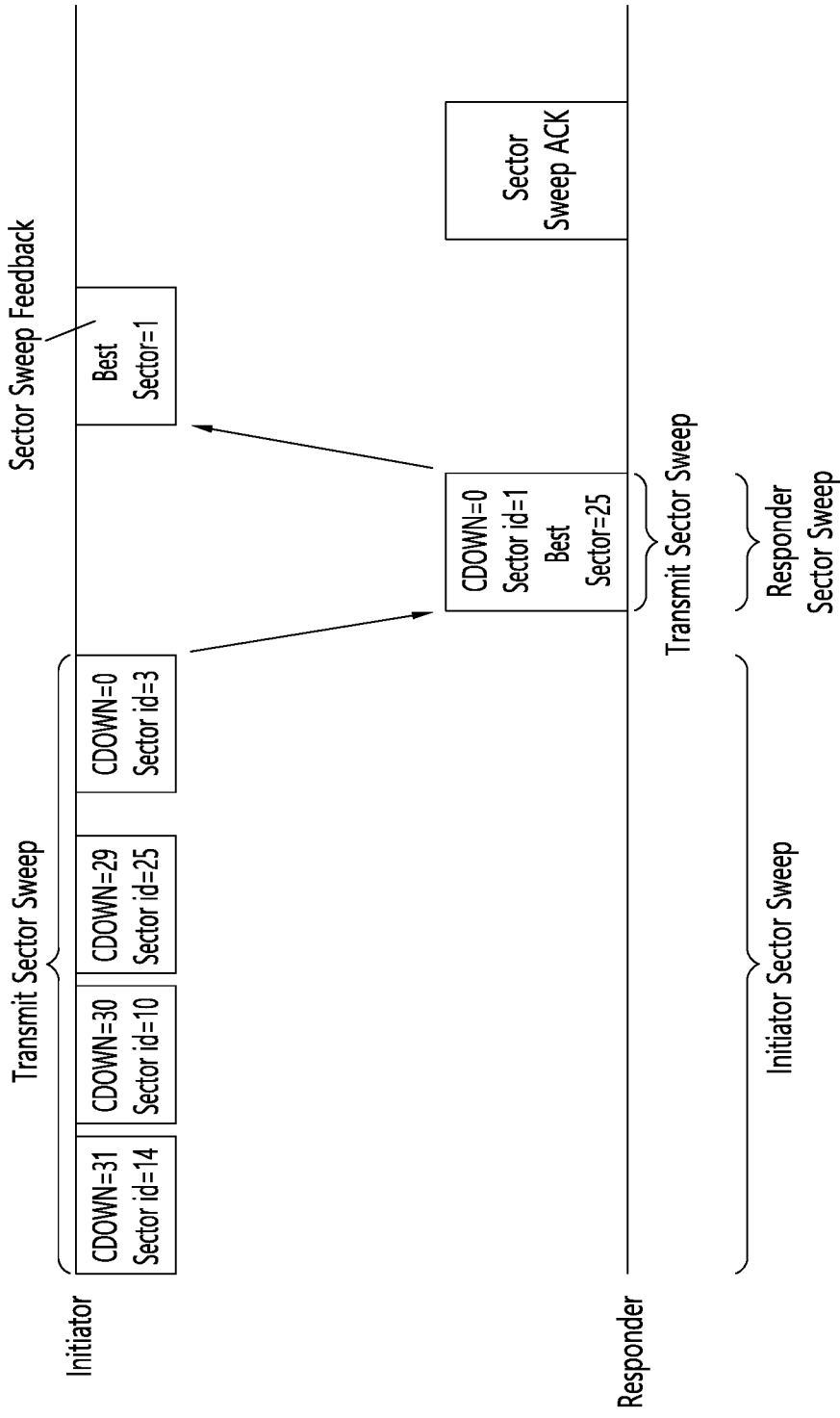

FIG. 13 and FIG. 14 is a diagram showing examples of a SLS phase.

In FIG. 13, the initiator has numerous sectors, and the responder has one transmit sector and one receive sector, which are used in the RSS. Accordingly, the responder transmits all of the responder SSW frames through the same transmit sector, and, at the same time, the initiator switches the receive antenna.

In FIG. 14, the initiator has numerous transmit sectors, and the responder has one transmit sector. In this case, the receive training for the initiator may be performed during the BRP phase.

Such SLS may be described as presented below.

As a protocol performing link detection in an 802.11ay system that can apply the present invention, the SLS corresponds to a beam training method, wherein network nodes consecutively transmits and/or receives frames including the same information by switching only the direction of the beam, and selecting, among the successfully received frames, a beam direction having the best index (e.g., Signal to Ratio (SNR), Received Signal Strength Indicator (RSSI), and so on) indicating the capability of the receive channel link.

Hereinafter, the BRP may be described as presented below.

As a protocol finely adjusting a beam direction that can maximize the data throughput from a beam direction, which is determined by the SLS or another means, the BRP may be performed when needed. Such BRP performs beam training by using a BRP frame, which is defined for the BRP protocol and which includes beam training information and information reporting the training results. For example, the BRP corresponds to a beam training method, wherein a BRP frame is transmitted and/or received by using a beam that is determined by a previous beam training, and wherein a beam training is actually performed by using a beam training sequence, which is included in an end part of the successfully transmitted and/or received BRP frame. The BRP is different from the SLS in that the SLS uses the frame itself for the beam training, whereas the BRP uses only a beam training sequence.

Such SLS phase may be performed during a Beacon Header Interval (BHI) and/or a Data Transfer Interval (DTI).

Firstly, the SLS phase being performed during the BHI may be the same as the SLS phase, which is defined in the 11ad system for its co-existence with the 11ad system.

Subsequently, the SLS phase, which is performed while the DTI is being performed, may be performed in case a beamforming training is not performed between the initiator and the responder, or in case a beamforming (BF) link is lost. At this point, if the initiator and the responder correspond to the 11ay STA, the initiator and the responder may transmit a short SSW frame instead of the SSW frame for the SLS phase.

Herein, the short SSW frame may be defined as a frame including a short SSW packet within a data field of a DMG control PHY or DMG control mode PPDU. At this point, a detailed format of the short SSW packet may be differently configured in accordance with the purpose (e.g., I-TXSS, R-TXSS, and so on) for which the short SSW packet is being transmitted.

The characteristics of the above-described SLS phase may also be applied to all of the SLS phases that will hereinafter be described.

3.1.2 Channel Bonding Setup Phase

Referring to FIG. 11, the STAs (e.g., initiator, responder, and so on) that intend to perform data communication in the above-described phase may transmit and/or receiving control information for channel bonding, channel aggregation, FDMA transmission, and so on, while sending and receiving an RTS (setup frame) and a DMG CTS (feedback frame) to and from one another. At this point, information for the transmission method using multiple channels, such as channel bonding, channel aggregation, FDMA transmission, and so on, wherein the information includes channel information, channel bandwidth, and so on, may be applied as the information being transmitted and received to and from one another.

In this exemplary embodiment, beamforming training for one channel (e.g., primary channel) has already been performed through the above-described SLS phase, and, accordingly, the initiator and the responder may assume that it is possible to equally apply the beamforming result (e.g., direction of the best sector) for the one channel to other channels as well. Accordingly, when the initiator and responder transmit the RTS and DMG CTS through multiple channels, the RTS and DMG CTS may be transmitted by applying the best sector direction, which is decided earlier through the SLS phase, as described above, to all of the channels.

3.1.3 Channel Bonding Transmission Phase

As shown in FIG. 11, after receiving the DMG CTS, which corresponds to the response to the transmitted RTS, the initiator may transmit actual data through multiple idle channels by using information formation on the channel that is negotiated with the responder, and other information, such as channel bandwidth, and so on.

More specifically, the initiator may transmit and/or receive the RTS and DMG CTS through the above-described channel bonding setup phase and may transmit and/or receive information on the actual channel to which the channel bonding (or channel aggregation) method is to be applied.

For example, although it is not shown in FIG. 11, even though the initiator has transmitted the RTS through a total of 4 channels, the initiator may receive DMG CTS for only 2 channels from the responder. This is because the responder has determined that the remaining 2 channels are currently in a busy state or in a state of being not available for usage.

By using the above-described method, the initiator and the responder may acquire information on the channel that can actually be used for the data transmitted, and the initiator may transmit data through channels that can actually be used.

At this point, since the initiator and the responder have already performed the beamforming training for only one channel (e.g., primary channel), the initiator and the responder may transmit and/or receive data signals by applying the beamforming training result (e.g., best sector direction), which was acquired from the one channel, to all channels.

Although FIG. 11 only shows the operation performed by the initiator for transmitting data by using channel bonding, the initiator may also transmit data by using the channel aggregation method.

In response to this, the responder may transmit an ACK frame through the same channel that was used by the initiator for transmitting the data. At this point, the ACK frame may be duplicated and transmitted through each channel, which was used for transmitting the data, or the ACK frame may be transmitted after performing channel bonding.

3.2. Performing Beamforming for Multiple Channels

Hereinafter, a beamforming procedure, wherein the above-described beamforming operation is performed on multiple channels (preferably, channels to and from which the initiator and responder are to transmit and/or receive data), will be described in detail.

The above-described beamforming training operation for one channel may not be optimized to the channel bonding process that uses multiple channels for the reasons listed below.

The characteristics of the one channel may not be the same as the characteristics of other channels.

The beamforming training result for the one channel may be different from the beamforming training result for the entire bandwidth.

Accordingly, in this section, as a solution (or method) for maximizing the capability gain in accordance with the channel bonding process, a detailed solution (or method) for performing beamforming training for the entire bandwidth, which is used for the channel bonding process, will hereinafter be described in detail.

Figure 15:
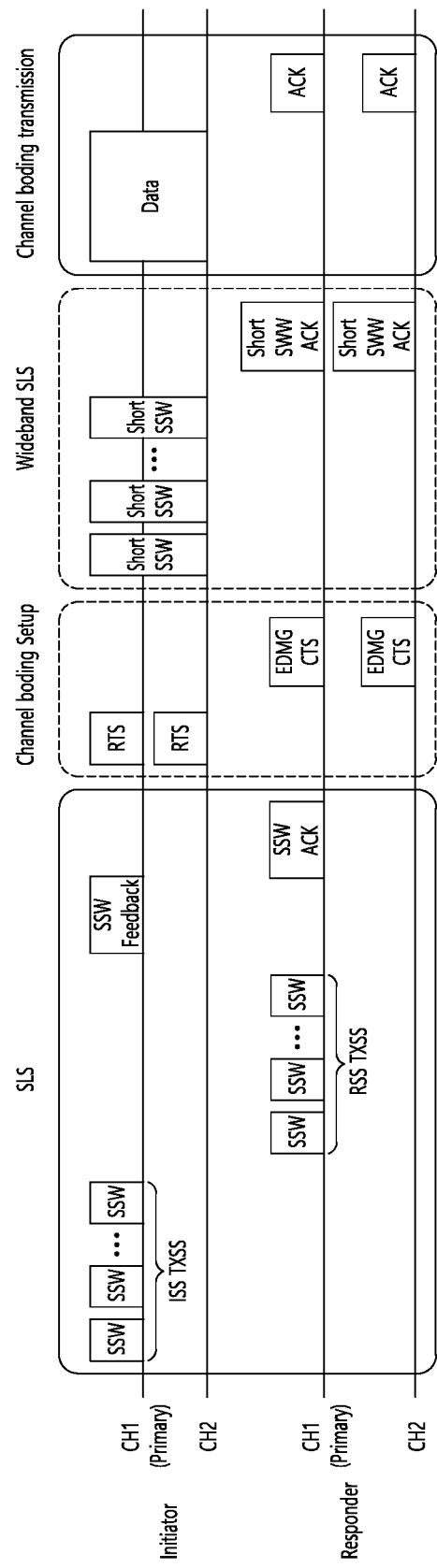
FIG. 15 is a diagram showing operations for performing beamforming on multiple channels according to another exemplary embodiment of the present invention.

FIG. 15 is a diagram showing operations for performing beamforming on multiple channels according to another exemplary embodiment of the present invention. Just as in the case shown in FIG. 11, referring to FIG. 15, an STA that intends to transmit data through the beamforming operation is referred to as an initiator, and an STA that receives the data from the initiator is referred to as a responder. Also, although only a total of 2 channels (e.g., CH1, CH2) are shown in FIG. 15, the configuration of the present invention may also be extendedly applied to channel bonding, channel aggregation, and so on, through 3 or more channels.

As shown in FIG. 15, the operation of performing beamforming for multiple channels according to another exemplary embodiment of the present invention may include a SLS phase, a channel bonding setup phase, a wideband SLS phase, and a channel bonding transmission phase. At this point, the wideband SLS phase will not be limited to the related art SLS configuration, and, therefore, the wideband SLS phase may include all beamforming training methods that can be extended to wideband beamforming training. For example, the wideband SLS phase may be replaced with a wideband BRP phase, which extendedly applies the related art BRP phase, or may include the wideband BRP phase.

Figure 16:
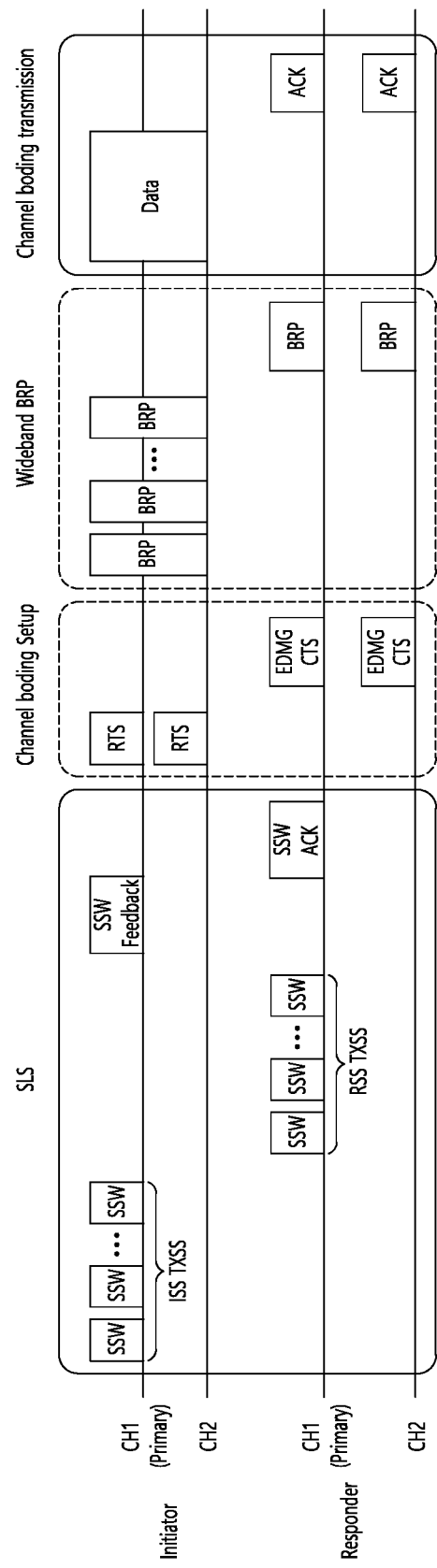
FIG. 16 is a diagram showing operations for performing beamforming on multiple channels according to yet another exemplary embodiment of the present invention.

FIG. 16 is a diagram showing operations for performing beamforming on multiple channels according to yet another exemplary embodiment of the present invention.

As described above, the wideband SLS phase of FIG. 15 may also be replaced with the wideband BRP phase of FIG. 16. Alternatively, according to yet another exemplary embodiment of the present invention, the wideband SLS phase of FIG. 15 may also be configured as a wideband beamforming training phase further including a wideband BRP phase.

3.2.1. SLS Phase

Just as in the above-described operations, which are described above in Section 3.1.1., the initiator and the responder may perform the SLS phase. By performing this phase, the initiator and the responder may perform beamforming training for one channel (e.g., primary channel).

Since the SLS phase has already been described above in detail, a detailed description of the same will be omitted for simplicity.

3.2.2 Channel Bonding Setup Phase

As described above in Section 3.1.2., the initiator and the responder may transmit and/or receive an RTS (setup frame) and a DMG CTS (feedback frame) through the channel bonding setup phase, and, then, the initiator and the responder may transmit and/or receive information for channel bonding, channel aggregation, FDMA transmission, and so on.

Moreover, in addition to the information mentioned above, the initiator and the responder may simultaneously transmit and/or receive information on the method for performing beamforming training on multiple channels to and from one another.

The initiator may notify the responder of the performance or non-performance of the beamforming training for multiple channel through a setup frame or RTS frame. For this, the initiator may transmit the setup frame or RTS frame including the information indicating the performance or non-performance of beamforming training for the multiple channels to the responder.

The responder may notify to the responder whether or not the beamforming training for multiple channels can be performed through a feedback frame or DMG CTS frame. For this, the responder may transmit the feedback frame or DMG CTS frame, which includes the information indicating whether or not the beamforming training for multiple channels can be performed, to the initiator.

Additionally, the responder may notify to the initiator which one of Initiator TX Sector Sweep (I-TXSS), Initiator RX Sector Sweep (I-RXSS), Responder TX Sector Sweep (R-TXSS), and Responder RX Sector Sweep (R-RXSS) is to be performed in the subsequent wideband SLS phase through the feedback frame or DMG CTS frame. Moreover, the responder may notify whether or not to perform beam training on the TX and the RX at the same time through the feedback frame or DMG CTS frame.

Alternatively, the responder may notify whether TX beamforming training is to be performed or whether RX beamforming training is to be performed is to be performed in the wideband BRP phase through the feedback frame or DMG CTS frame. Alternatively, the responder may notify whether or not to perform beam training on the TX and the RX at the same time through the feedback frame or DMG CTS frame.

As shown in the above-described configurations, the beamforming training related information that is transmitted and received by the initiator and the responder to and from one another in the channel bonding setup phase may be included in any one of the setup frame and the feedback frame.

Additionally, in case the initiator intends to transmit data to the responder by using the FDMA method, the initiator may perform the FDMA transmission setup through the channel bonding set up phase.

More specifically, the initiator may signal a resource unit (RU) allocation, a channel feedback request, a report method, and so on, through a setup frame (or RTS frame).

Additionally, the responder may notify a Signal to Noise Ratio (SNR) or Signal to Interference & Noise Ratio (SINR) through a feedback frame by using feedback values corresponding to the available channels.

As described above, the initiator and the responder may transmit and/or receive the RTS frame and the DMG CTS frame to and from one another through the channel bonding setup phase. At this point, since the initiator and the responder has performed the beamforming training for one channel (e.g., primary channel) through the above-described SLS phase, the initiator and the responder may also transmit and/or receive the RTS frame and the DMG CTS frame by applying the same best sector direction for the one channel to other channels as well. At this point, the RTS frame and the DMG CTS frame that are transmitted through each of the channels may be duplicated and transmitted for each channel.

4. Proposed Embodiment

In order to achieve a transfer rate required in 802.11ay, a transmission technique using MIMO shall also be supported during a TDD-SP.

In general, a beamforming process for MIMO during an SP or CBAP is achieved through bi-directional transmission/reception continuously with an interval of medium beamforming inter-frame space (MBIFS). However, in case of the TDD-SP, a beamforming process for typical MIMO cannot be used since a UL duration and a DL duration are strictly distinct. This is because a significantly long time is required until beamforming is complete. Therefore, the beamforming process becomes ineffective, which makes it difficult to satisfy performance required in a system.

The present invention proposes a beamforming process for MIMO transmission during a TDD-SP as a method which is fast and effective according to a TDD-SP characteristic.

4.1 TDD-SP Structure

FIG. 17 is a diagram showing an extended schedule element applicable to the present invention. An EDMG extended schedule element of FIG. 17 defines channel scheduling for EDMG BSS, and includes an indicator for channels scheduled to be assigned.

Figure 19:
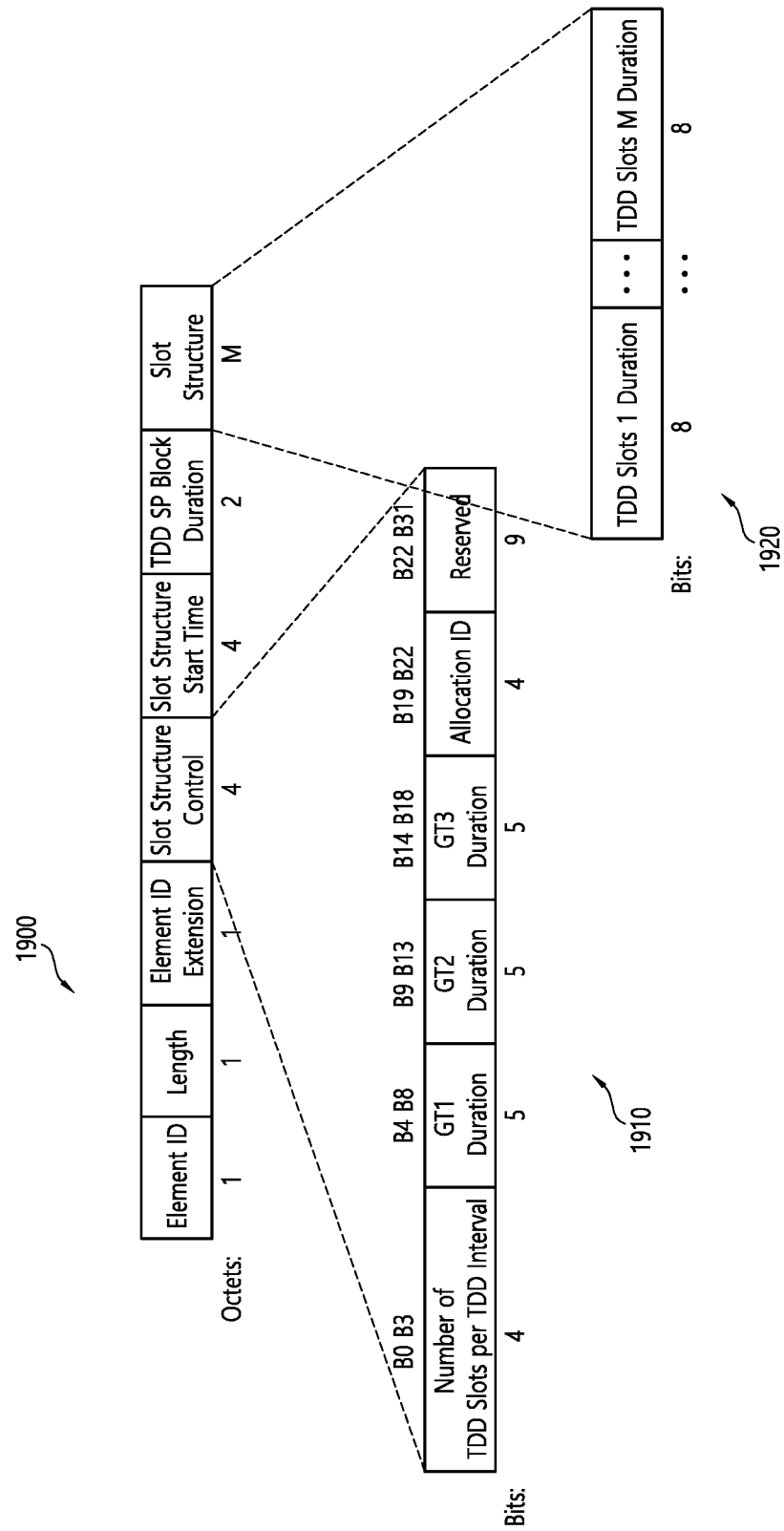
FIG. 19 is a diagram showing a slot structure control field and slot structure field included in a TDD slot structure element.

FIG. 18 is a diagram showing a TDD slot structure element applicable to the present invention. FIG. 19 is a diagram showing a slot structure control field and slot structure field included in a TDD slot structure element.

Referring to a slot structure control field 1910 of FIG. 19, a value obtained by adding '1' to a value of a subfield (4 bits) of "Number of TDD slot per TDD Interval" indicates the number of TDD slots per TDD interval. Subfields of a GT1 duration, GT2 duration, and GT3 duration indicate a duration of the guard times GT1, GT2, and GT3 of FIG. 5 in unit of microseconds. An allocation ID field is set to the same value as an allocation ID field of an allocation control field of the extended schedule element of FIG. 17 indicating a TDD allocation.

A subfield of slot structure start time of FIG. 18 indicates lower 4 octets of a TSF timer at a start point of a first TDD SP in which a slot structure takes effect. A subfield of TDD SP block duration of FIG. 18 indicates a TDD SP duration in unit of microseconds.

The number of octets of the slot structure field 1920 of FIG. 19 is the same as a subfield value of "Number of TDD slot per TDD Interval" of FIG. 19. A subfield of TDD slot i duration ($1 \leq i \leq M$) indicates a duration of an i-th TDD slot of each TDD interval in unit of microseconds.

Figure 20:
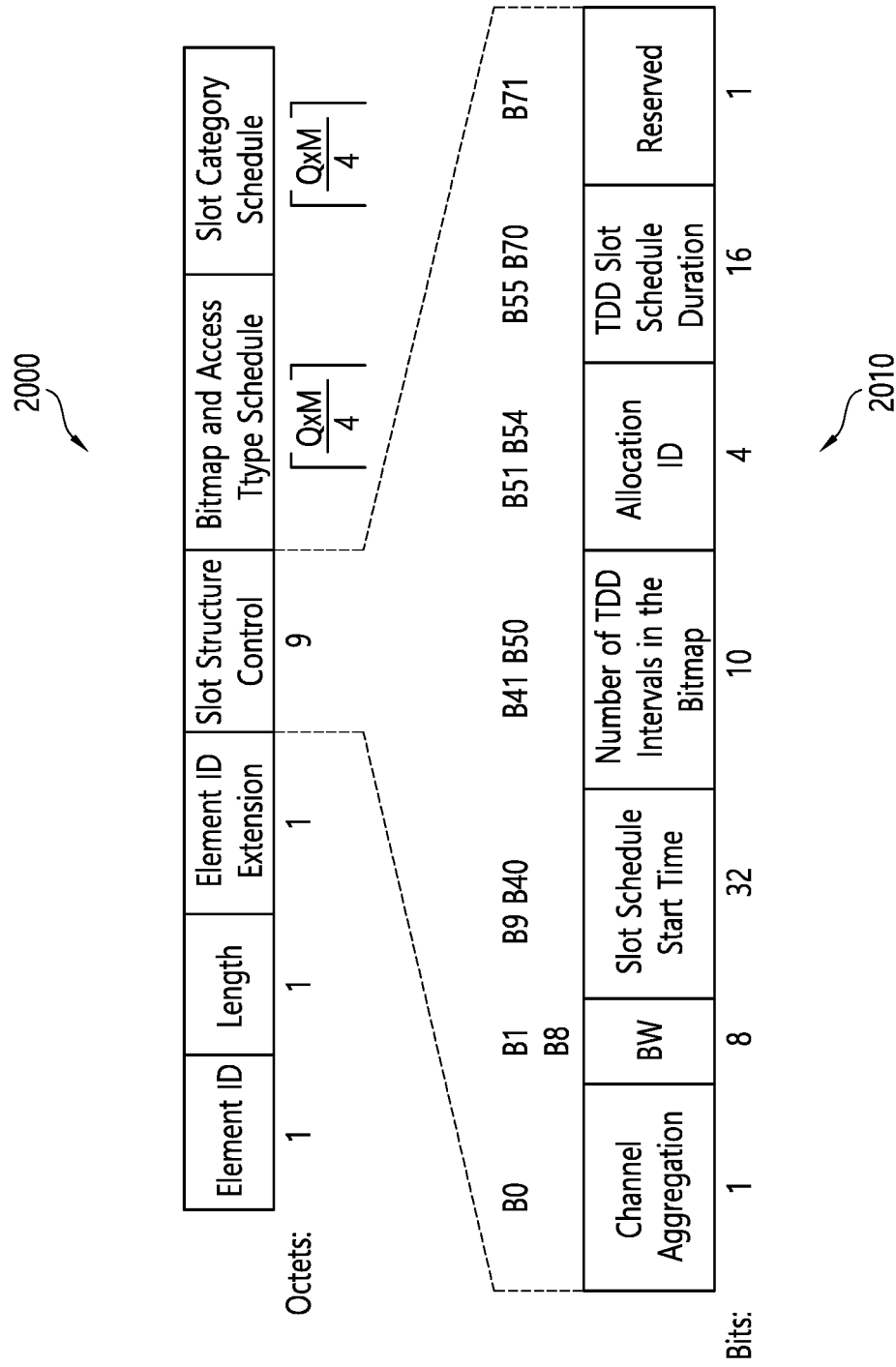
FIG. 20 is a diagram showing a TDD slot schedule element and a slot schedule control field included in the TDD slot schedule element.

FIG. 20 is a diagram showing a TDD slot schedule element and a slot schedule control field included in the TDD slot schedule element.

A TDD slot schedule element 2000 of FIG. 20 defines an access allocation of a DMG STA for a TDD slot within a TDD-SP.

A TDD slot schedule control field 2010 of FIG. 20 is as follows.

A subfield of Slot Schedule Start Time indicates lower 4 octets of a TSF timer at a start point of a first TDD SP in which a schedule takes effect.

A subfield of "Number of TDD Intervals in the Bitmap" indicates the number of TDD intervals described in a subfield of Bitmap and Access Type Schedule after a time indicated by the subfield of Slot Schedule Start Time.

An allocation ID field is set to the same value as an allocation ID field of an allocation control field of the extended schedule element of FIG. 17 indicating a TDD allocation.

A subfield of TDD Slot Schedule Duration indicates a duration from a start of a first TDD interval in which a schedule takes effect to an end of a last TDD interval in unit of microseconds.

A subfield of Bitmap and Access Type Schedule defines access allowing of a DMG STA for a TDD slot type and a TDD slot covered by the bitmap.

A PCP/AP(DN) informs an STA (CN/DN) of a TDD-SP structure by using an extended schedule element and a TDD slot structure element. In addition, the PCP/AP informs the STAs of a specific TDD slot to which allocation is achieved within a specific TDD interval by using a TDD slot schedule element. Therefore, the STA assigned to the specific TDD slot may perform only one of transmission and reception operations during the TDD slot.

A parameter of a TDD structure within the TDD SP is defined by a TDD slot structure element. A non-AP and a non-PCP STA shall not transmit the TDD slot structure element. A DMG AP or a DMG PCP shall transmit the TDD slot structure element to each non-AP and non-PCP DMG STA expected to perform transmission and reception during the TDD SP. The TDD slot structure element may be included in a DMB beacon or announce frame transmitted by the DMG AP or the DMG PCP. Upon receiving the TDD slot structure element corresponding to an allocation identified by using an allocation ID subfield value within the element, the DMG STA shall adopt the TDD slot structure within the element with respect to all TDD SPs identified by using the same allocation ID subfield value at a time indicated by a slot structure start time subfield value within the element. The current TDD structure shall be maintained to be valid starting from a time of receiving the TDD slot structure element updated until the DMG STA adopts the TDD structure. A repetition period for each TDD interval in the TDD SP from one beacon interval to a next beacon interval is the same fixed number as the beacon interval.

The TDD slot schedule element is used to allocate TDD slots within the TDD SP. Before association, except for transmission of the TDD beamforming frame, the DMG STA shall not perform transmission unless a TDD slot schedule element indicating that it is assigned to a bitmap for the same STA as TX and at least one TDD slot within the TDD SP having an access type schedule field by means of the DMG AP or the DMG PCP. The DMG AP or the DMG PCP shall transmit the TDD slot schedule element transferred through an MLME-TDD-SLOT-SCHEDULE.request primitive to each DMG STA assigned to access the TDD SP. This transmission shall be performed by using an announce frame or an association response frame before a time indicated by the value of the Slot Schedule Start Time subfield within the element. Upon reception of the TDD slot schedule element corresponding to the allocation identified by the allocation ID subfield value within the element, the DMG STA shall adopt a schedule within the element at the time indicated by the value of the Slot Schedule Start Time subfield within the element.

The non-AP and the non-PCP DMG STA may transmit a TDD slot schedule element of an announce frame or (re) association request frame to the DMG AP or the DMG PCP. In this case, the bitmap and access type schedule field of the element indicates availability of the STA, and may be used to input a schedule of the AP or one PCP.

The TDD slot shall not overlap in terms of time. The TDD slot may be a simplex TDD slot, an unavailable TDD slot, or three unassigned TDD slots. The STA shall not perform transmission in the unassigned TDD slot or the unavailable TDD slot. RX and TX operations during the simplex TDD slot vary depending on an STA behavior indicated in the bitmap and access type schedule field defined in Table 2 below.

TABLE 2

| Encoding | Behavior of STA that transmits the TDD Schedule element | Behavior of STA that receives the TDD Schedule element |
|---|---|---|
| 0 | N/A; TDD slot unassigned | |
| 1 | Simplex TX | Simplex RX |
| 2 | Simplex RX | Simplex TX |
| 3 | N/A; Unavailable | |

If the bitmap and access type schedule field indicates a value different from TX for the STA for the TDD slot, the STA shall not perform transmission in the simplex TDD slot.

In a simplex TDD slot in which the STA has the same bitmap and access type scheduled field as TX, the STA shall initialize transmission to a peer STA assigned to the TDD slot when the TDD slot starts.

In a simplex TDD slot in which the STA has the same bitmap and access type schedule field as RX, the STA shall be beam-formed towards the peer STA assigned to the TDD slot and remain in a receiver state during the TDD slot is continued. This is to receive transmission from the peer STA.

Upon receiving the TDD slot schedule element from the AP or the STA indicating that the TDD slot is an unavailable TDD slot in a corresponding STA, the AP or the PCP does not schedule transmission or reception in the TDD slot for the STA.

In order to achieve a transfer rate required in 802.11ay in this TDD-SP structure, a beamforming (BF) method capable of applying single user (SU)-MIMO is proposed.

4.2 Method of Using the Existing SU-MIMO Beamforming Procedure

Figure 21:
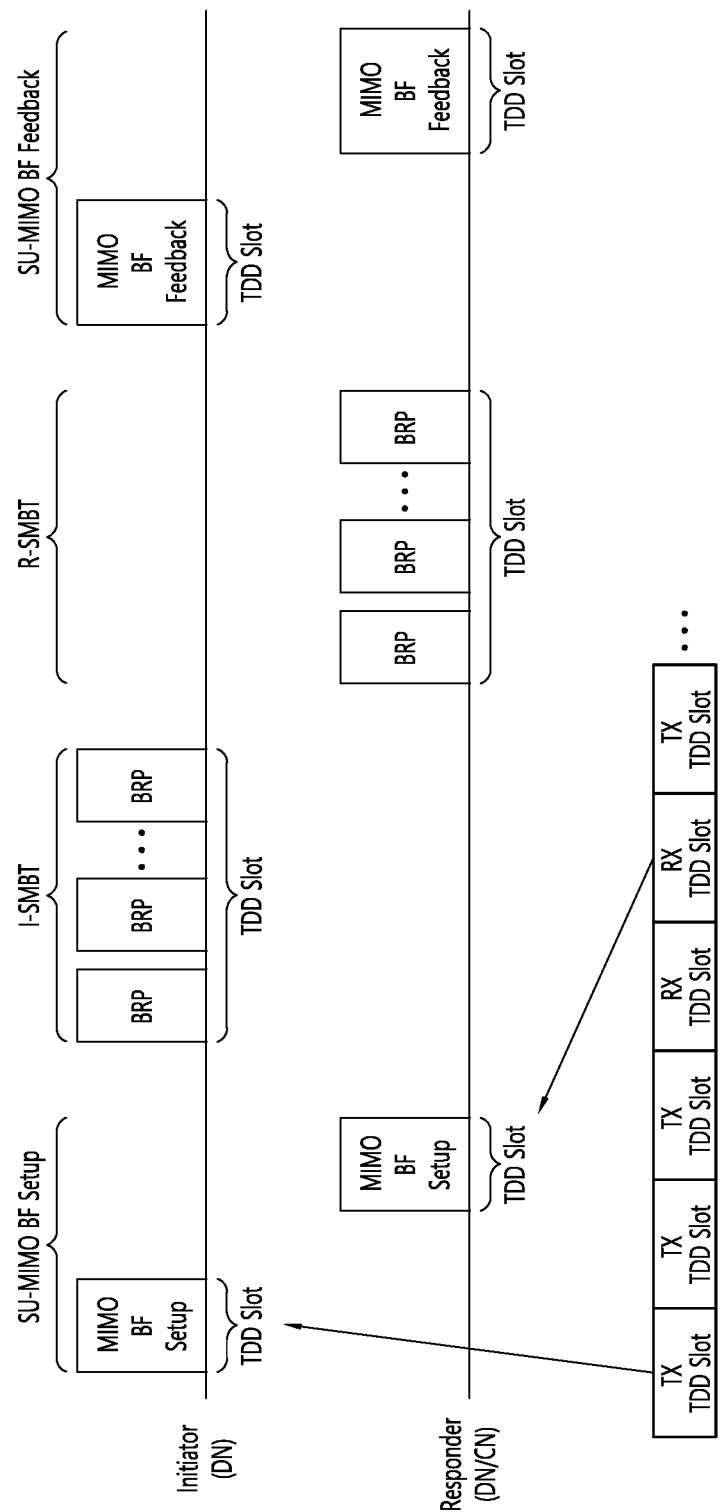
FIG. 21 shows an example of an SU-MIMO beamforming process applicable to the present invention.

FIG. 21 shows an example of an SU-MIMO beamforming process applicable to the present invention.

Referring to FIG. 21, an SU-MIMO beamforming process may be applied when a channel access in the DTI interval of FIG. 5 is a CBAP and an SP.

A PCP/AP(DN) informs a specific STA(CN) of a TDD-SP structure, and assigns specific slots for SU-MIMO beamforming. In a TX TDD slot in which an initiator performs transmission, a responder operates in a receive mode. In an RX TDD slot in which a responder performs transmission, the initiator operates in the receive mode.

When SU-MIMO beamforming is performed by using the method of FIG. 21, a plurality of TDD slots are required, and thus a plurality of TDD intervals are required. Therefore, a long period of time is required until beamforming is complete.

However, even if the existing procedure is reused, there is no choice but to perform transmission according to the TDD slot schedule. Therefore, an SU-MIMO BF procedure shall be performed according to a TDD slot schedule determined in the DN, without having to follow a rule of transmission any longer after an MIFS used between the existing sub-procedures.

4.3 MU-MIMO Power Save

Figure 22:
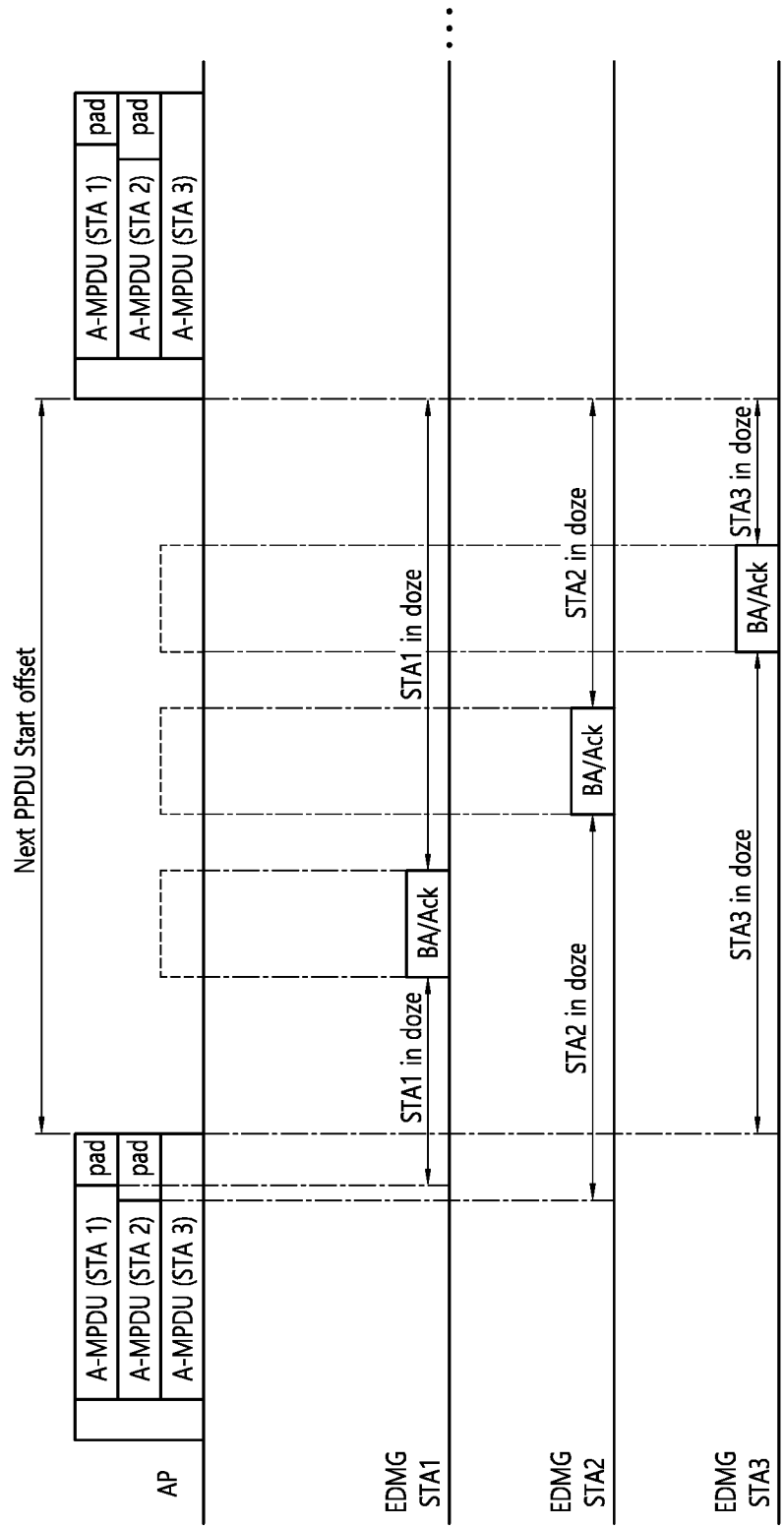
FIG. 22 shows an example of MU-MIMO power save (PS) applicable to the present invention.

FIG. 22 shows an example of MU-MIMO power save (PS) applicable to the present invention. Specifically, in the example of FIG. 22, the MU-MIMO PS is performed in an MU group in which three EDMG STAs are included.

An MU-MIMO PS mechanism enables a non-AP and non-PCP EDMG STA in an infra BSS or PBSS to proceed to a PS mode during a TXOP in which an STA is involved in the MU-MIMO transmission and acknowledgement procedure.

The EDMG STA which receives an A-MPDU within an EDMG MU PPDU may proceed to the PS mode during the following two periods.

First period: from the end of an individual A-MPDU within the EDMG MU PPDU to the time point at which a BA or RD response burst shall be transmitted to an initiator Second period: from the time of sending back the BA or RD response burst to the time indicated in a next PPDU start offset subfield of a block Ack schedule frame starting from the end of EDMG MU PPDU An STA which fails to receive the block Ack schedule frame within the received MU PPDU shall remain awake in a receive mode until a BlockAckReq or Block Ack Schedule frame is received from the initiator or until the end of TXOP, whichever comes first.

After waking up at the end of the second period, the EDMG STA shall remain in an awake state until a next EDMG MU PPDU is received from the initiator or until a current TXOP ends, whichever occurs first.

4.4 Power Management in PBSS and DMG Infrastructure BSS

In the present embodiment, a power save (PS) mechanism enables a non-AP STA to be in a sleep state for one or more beacon intervals or for parts of the beacon interval.

A non-AP and non-PCP STA PS mechanism enables a non-AP and a non-PCP STA to sleep after AP or PCP signaling, or to sleep according to a periodic schedule negotiated with the AP or the PCP. The non-AP and the non-PCP STA may use both mechanisms to increase a PS opportunity.

Similarly, the PCP PS mechanism enables the PCP to sleep after sending a signal to at least one non-AP and non-PCP STA, or to sleep according to a wakeup schedule that is available to all STAs associated with the PCP.

The non-AP STA may be in one of two power management modes.

Active mode: The STA does not use a scheduled or unscheduled PS mechanism defined herein, and operates in an awake state except for a time interval for determining that it is not a target of transmission performed by another STA. In this case, the STA may operate in a doze state.

Power save (PS) mode: The STA uses at least one of a scheduled or unscheduled PS mechanism defined in the present embodiment, and performs state transition between the awake state and the doze state.

The non-AP STA shall be in an active mode upon (re) association.

For a scheduled PS, a DMG wakeup schedule element is used to communicate a sleep and wakeup pattern of a DMG STA, which is called an STA wakeup schedule (WS). The STA wakeup schedule defines a cycling period between a set of contiguous beacon intervals referred to as an awake beacon interval (BI) and a set of contiguous beacon intervals referred to as a doze BI. Table 3 and Table 4 show an overview of a rule for alternating between awake and doze power states during the awake BI and the doze BI.

STA is aware of a wakeup schedule of another STA, the tracking of the wakeup schedule may be maintained.

The wakeup schedule is autonomous, and each STA transfers traffic to a peer STA only when the peer STA is in an awake state.

An STA which has transmitted a frame to an AP or a PCP which is not associated with the AP and from which a response is expected shall remain in an awake state until such a response is received or until the procedure has timed out.

Table 3 above lists power states for a non-AP or non-PCP STA in a PS mode and a PCP in a PS mode during an awake

TABLE 3

| | Portion of the beacon interval | PPS PCP | PS non-AP and non-PCP STA |
|---|---|---|---|
| BHI | BTI | Awake | Awake or doze |
| | A-BFT | Awake | Awake or doze |
| | ATI | Awake | Awake |
| DTI | CBAP with the PCP Active field set to 1 in the schedule | Awake or doze | Awake or doze |
| | CBAP with the PCP Active field set to 0 in the schedule | Doze | Awake or doze |
| | SP with Destination AID set to broadcast AID | Awake | Awake |
| | Nontruncatable or nonextensible SP with non-PCP STA as Source AID or Destination AID | Awake or doze | Awake or doze |
| | Truncatable SP or extensible SP with non-AP and non-PCP STA (excluding the PS STA) as Source AID or Destination AID | Awake | Awake or doze |
| | SPs allocated to itself | Awake or doze | Awake or doze |
| | All other SPs | Awake or doze | Awake or doze |
| | Awake window | Awake | Awake |
| | DTI with CBAP Only subfield set to 1 | Awake or doze | Awake or doze |
| | Destination AID field of a CBAP equal to the broadcast AID in the schedule | Awake or doze | Awake or doze |

TABLE 4

| | Portion of the beacon interval | PPS PCP | PS non-AP and non-PCP STA |
|---|---|---|---|
| BHI | BTI | Awake | Awake or doze |
| | A-BFT | Awake | Awake or doze |
| | ATI | Awake | Awake |
| DTI | CBAP with the PCP Active field set to 1 in the schedule | Awake or doze | Awake or doze |
| | CBAP with the PCP Active field set to 0 in the schedule | Doze | Awake or doze |
| | SP with Destination AID set to broadcast AID | Awake | Awake |
| | Nontruncatable or nonextensible SP with non-PCP STA as Source AID or Destination AID | Awake or doze | Awake or doze |
| | Truncatable SP or extensible SP with non-AP and non-PCP STA (excluding the PS STA) as Source AID or Destination AID | Awake | Awake or doze |
| | SPs allocated to itself | Awake or doze | Awake or doze |
| | All other SPs | Awake or doze | Awake or doze |
| | Awake window | Awake | Awake |
| | DTI with CBAP Only subfield set to 1 | Awake or doze | Awake or doze |
| | Destination AID field of a CBAP equal to the broadcast AID in the schedule | Awake or doze | Awake or doze |

An STA in a PS mode, which follows a wakeup schedule and has performed unscheduled power saving, shall follow a doze BI rule of the present embodiment and shall follow an ATIM rule for a non-AP STA without wakeup schedule.

The AP or the PCP tracks a wakeup schedule of all associated non-APs and non-PCP STAs. The non-AP and the non-PCP STA track the wakeup schedule of all non-APs and non-PCP STAs which perform communication. There is no end of the wakeup schedule. When the STA enters the PS mode according to the wakeup schedule, the PS mode is infinitely maintained until the PS mode ends through a mechanism defined in the present embodiment. When the BI. Each item indicates either an awake state or a sleep state for the non-AP and the non-PCP STA or the PCP in the PS mode at several time points during the awake BI.

Table 4 above lists power states for a non-AP or non-PCP STA in a PS mode and a PCP in a PS mode during a doze BI. Each item indicates wither an awake state or a sleep state for the non-AP and the non-PCP STA or the PCP in the PS mode at several time points during the doze BI.

In addition, the following table may be further added in the power state for the awake BI of Table 3 above.

TABLE 5

| Portion of the beacon interval | | PPS PCP | PS non-AP and non-PCP STA |
|---|---|---|---|
| DTI | Unassigned TDD Slot | Awake or doze | Doze |
| | Assigned Simplex Rx TDD Slot | Awake | Awake |
| | Assigned Simplex Tx TDD Slot | Awake | Awake or doze |

Table 5 above lists power states for a non-AP and non-PCP STA in a PS mode and a PCP in a PS mode during an awake BI (or doze BI). That is, Table 5 above shows the power states of the non-AP and non-PCP STA in the PS mode and the PCP in the PS mode in an unassigned TDD slot, assigned simplex RX TDD slot, and assigned simplex Tx TDD slog during a DTI.

In the 11ay, a method of operating TDD scheduling is possible in which downlink (DL)/uplink (UL) transmission is performed by temporally dividing the existing service period (SP) interval. In the TDD scheduling, there may be no special operation in slots other than an assigned DL/UL slot. In this case, a power saving technique may be introduced to more effective power management than the conventional system. The present specification proposes a method for effective power saving when the TDD scheme operates in the 11ay.

The present specification proposes an effective power saving method in a practical TDD scheduling scheme. In a TDD SP, a TX/RX slot operates by performing assignment and scheduling suitable for an STA. In this case, there may be a case where the STA/AP does show a special behavior in an interval other than an assigned slot and a slot in which data is actually transmitted. In this case, effective power saving shall also be managed through a power control in an interval other than the assigned slot and the slot in which data is actually transmitted. The present specification proposes a method of effectively managing power saving in a TDD SP.

In the 11ay TDD channel access, a TDD slot of a DN/CN is assigned in advance through TDD slot scheduling. In this process, the STA and the AP may know whether a TDD slot of a certain time point is assigned and a time at which the assignment occurs. An interval for power saving in the TDD AP may be configured and predicted by using an assigned slot structure, start time, scheduling duration, or the like. A method for effective power saving in a TDD SP is proposed.

In the TDD SP, power saving may be managed in the following unit (see FIG. 5).
  TDD slot
  Aggregation of several TDD slots
  TDD interval
  Aggregation of several TDD intervals
  TDD SP
  Beacon interval One or several options may be applied as follows for a start and end time or a duration of power saving in the TDD SP.
  Maintain power saving from a start time of a TDD interval to an assigned initial TDD slot
  Maintain power saving from an end time of an assigned TDD slot to a start time of a next assigned TDD slot
  Maintain power saving from an end time of an assigned TDD slot to a start time of a next TDD interval
  Maintain power saving from a last TDD slot assigned in a last received slot schedule element to a time at which a next slot schedule element or a slot structure element is received
  Maintain power saving according to a slot type
    Power saving is not achieved in one or both of TX/RX slots
    Power saving in case of an unassigned slot: Power saving is also possible in an unassigned TDD slot according to a condition. In this case, an applicable condition may be one of the followings.
  STA configured not to perform power saving
  TDD slot configured not to perform power saving
  TDD interval configured not to perform power saving
  TDD SP configured not to perform power saving
  BI configured not to perform power saving In addition, whether power saving will be applied may also be announced. An announcing method may use one of the following fields. In this case, N (positive integer) bits may be used for the announcement, and the N bits may be included in one of the followings.
  TDD slot structure element format
  Slot structure control field format
  TDD slot schedule element format
  Slot schedule control field format In this case, the N bits may be expressed as follows.
  0: power saving rule is applied/1: power saving rule is not applied
  1: power saving rule is applied/0: power saving rule is not applied Whether power saving is applied, which is expressed by using this value, may be applied until a next indication, and a specific interval may be set so that it is valid only during the interval.

Embodiment 1

This is an embodiment of managing power saving in a TDD SP. In this case, the following options are applied.
  Maintain power saving from a start time of the TDD SP to an assigned initial TDD slot
    Alternatively, a slot start time indicated in a slot schedule element may be used as a start
  Maintain power saving from an end time of an assigned TDD slot to a start time of a next assigned TDD slot
  Advantages of the embodiment: If such an option is applied, power saving is achieved during a time at which a TX/RX operation is actually performed in an assigned TDD slot.

Embodiment 2

A rule of the following content may be applied optionally in part.
  1. Doze from a TDD schedule element reception time to a TDD scheduling start time (applied in common)
  2. Interval/slot unit (optional)
    A. Doze in an unallocated interval/slot
    B. Awake from an initially assigned slot or interval to a last assigned slot or interval (otherwise, doze)
  3. The following option is applicable when operating in unit of slot (optional)
    A. Doze state is possible in Rx slot
  4. MD (more data)/EOSP (end of service period) (applied in common)
  Doze at the remain period if MD=0 or EOSP=1

In the TDD SP, power saving may occur in the following unit.

TDD SP
TDD interval
TDD slot

Embodiment 3

An embodiment in which power saving occurs in unit of TDD slots is as follows.

Doze in an unassigned TDD slot

In an assigned TDD slot, from a time at which EOSP is set to 1 to an end time of a corresponding TDD slot This may be defined and expressed as follows by using the existing standard document.

The source DMG STA and the destination DMG STA of a nontruncatable SP, allocated CBAP (Contention Based Access Point) or allocated TDD slot with individually addressed destination AID may go to doze state within the SP, within the CBAP or within the TDD slot, respectively, after the source DMG STA transmitted a frame to the destination DMG STA of the SP, the CBAP or the TDD slot, respectively, with the EOSP subfield set to 1 and received the following response frame from the destination DMG STA of the SP, the CBAP or the TDD slot, respectively.

Figure 23:
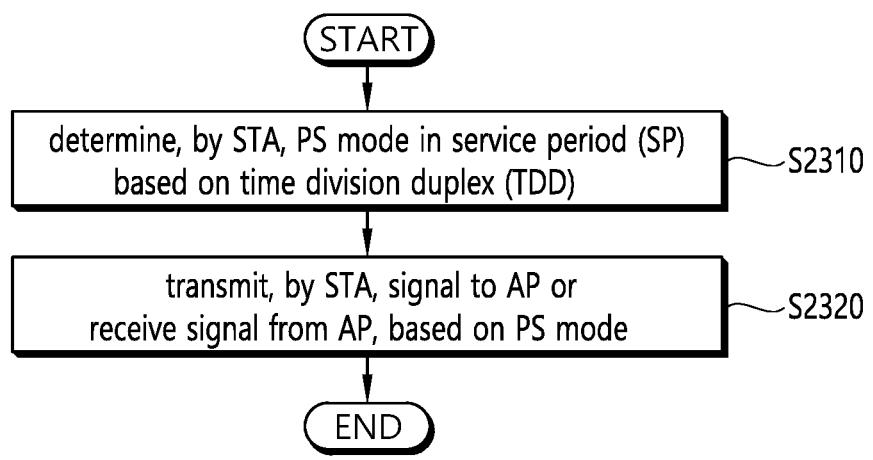
FIG. 23 is a flowchart showing a procedure of transmitting/receiving a signal based on a PS mode from an STA perspective according to the present embodiment.

FIG. 23 is a flowchart showing a procedure of transmitting/receiving a signal based on a PS mode from an STA perspective according to the present embodiment.

The present embodiment proposes a method of transmitting/receiving a signal by performing MIMO beamforming during a TDD-SP to achieve a transfer rate required in 802.11ay.

First, summarizing terminologies, a first STA may correspond to a responder for performing beamforming, and a second STA may correspond to an initiator for performing beamforming. In addition, the first STA may be a non-AP STA or a non-PCP (Personal basic service set Control Point) STA or a PCP STA. MIMO beamforming described in the present embodiment is performed between the first STA and the second STA. In the presence of one first STA, single user (SU)-MIMO beamforming may be performed, and in the presence of a plurality of first STAs, multi-user (MU)-MIMO beamforming may be performed.

In step S2310, the first STA determines the PS mode in a service period (SP) based on a time division duplex (TDD).

In step S2320, the first STA transmits the signal to the second STA or receives the signal from the second STA based on the PS mode.

The SP includes a plurality of TDD slots.

The first STA may receive a beacon frame or an announce frame from the second STA.

The beacon frame or the announce frame may include a TDD slot structure element. The plurality of TDD slots may be determined by the TDD slot structure element.

The plurality of TDD slots include an unassigned TDD slot, an assigned Tx TDD slot, and an assigned Rx TDD slot. That is, the signal is not transmitted/received in the unassigned TDD slot. The signal may be received from the second STA in the assigned Rx TDD slot, and may be transmitted to the second STA in the assigned Tx TDD slot.

In the unassigned TDD slot, a PS mode of the first STA is determined as a doze state, and a PS mode of the second STA is determined as an awake or doze state. Since the unassigned TDD slot is not assigned to the first STA, the first STA (STA) is in the doze state, but the second STA (AP) may autonomously make a decision to become the awake state.

In the assigned Rx TDD slot, the PS mode of the first STA is determined as the awake state, and the PS mode of the second STA is determined as the awake state. In the assigned Rx TDD slot, the second STA (AP) has to send a signal to the first STA (STA), both the first and second STAs shall be in the awake state.

In the assigned Tx TDD slot, the PS mode of the first STA is determined as the awake or doze state, and the PS mode of the second STA is determined as the awake state.

If a signal to be transmitted by the first STA exists in the assigned Tx TDD slot, the PS mode of the first STA may be determined as the awake state, and the signal may be transmitted to the second STA in the assigned Tx TDD slot. If the signal to be transmitted by the first STA does not exist in the assigned Tx TDD slot, the PS mode of the first STA may be determined as the doze state. That is, since the first STA (STA) has to send a signal to the second STA (AP) in the assigned Tx TDD slot, the second STA shall be awake unconditionally. However, the first STA may become the awake state only if there is a signal to be sent, and may become the doze state if there is no signal to be sent.

In addition, the first STA may receive a TDD slot schedule element from the second STA. The assigned Tx TDD slot and the assigned Rx TDD slot may be determined by the TDD slot schedule element. The PS mode may be determined after the TDD slot schedule element is received.

The beacon frame or the announce frame and the signal may be transmitted/received within a beacon interval. The beacon interval may include a beacon header interval (BHI) and a data transfer interval (DTI).

The BHI may include a beacon transmission interval (BTI), association beamforming training (A-BFT), and an announcement transmission interval (ATI). The DTI may include at least one contention based access period (CBAP) and the SP. The beacon frame may be transmitted in the BTI. The announce frame may be transmitted in the ATI. Beamforming training between the first STA and the second STA may be performed in the A-BFT.

If the beacon interval is in the awake state, in the BHI, the PS mode of the first STA may be determined as the awake or doze state, and the PS mode of the second STA may be determined as the awake state. In addition, in the A-BFT, the PS mode of the first STA may be determined as the awake or doze state, and the PS mode of the second STA may be determined as the awake state. In addition, in the ATI, the PS mode of the first STA may be determined as the awake state, and the PS mode of the second STA may be determined as the awake state.

If the beacon interval is in the doze state, in the BHI, the PS mode of the first STA may not be defined (N/A), and the PS mode of the second STA may be determined as the awake or doze state. In the A-BFT, the PS mode of the first STA may not be defined (N/A), and the PS mode of the second STA may be determined as the awake or doze state. In the ATI, the PS mode of the first STA may be determined as the awake state, and the PS mode of the second STA may be determined as the awake state.

Figure 24:
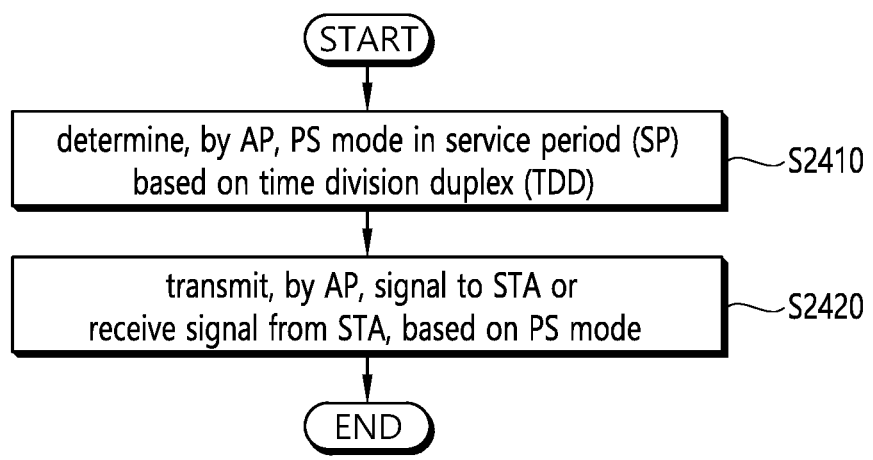
FIG. 24 shows a procedure of transmitting/receiving a signal based on a PS mode from an AP perspective according to the present embodiment.

FIG. 24 shows a procedure of transmitting/receiving a signal based on a PS mode from an AP perspective according to the present embodiment.

The present embodiment proposes a method of transmitting/receiving a signal by performing MIMO beamforming during a TDD-SP to achieve a transfer rate required in 802.11ay.

First, summarizing terminologies, a first STA may correspond to an initiator for performing beamforming, and a second STA may correspond to a responder for performing beamforming. In addition, the first STA may be an AP or a Personal basic service set Control Point (PCP), and the second STA may be a non-AP STA or a non-PCP STA.

MIMO beamforming described in the present embodiment is performed between the first STA and the second STA. In the presence of one second STA, single user (SU)-MIMO beamforming may be performed, and in the presence of a plurality of second STAs, multi-user (MU)-MIMO beamforming may be performed.

In step S2410, the first STA determines the PS mode in a service period (SP) based on a time division duplex (TDD).

In step S2420, the first STA transmits the signal to the second STA or receives the signal from the second STA based on the PS mode.

The SP includes a plurality of TDD slots.

The first STA may transmit a beacon frame or an announce frame to the second STA.

The beacon frame or the announce frame may include a TDD slot structure element. The plurality of TDD slots may be determined by the TDD slot structure element.

The plurality of TDD slots include an unassigned TDD slot, an assigned Tx TDD slot, and an assigned Rx TDD slot. That is, the signal is not transmitted/received in the unassigned TDD slot. The signal may be transmitted to the second STA in the assigned Rx TDD slot, and may be received from the second STA in the assigned Tx TDD slot.

In the unassigned TDD slot, a PS mode of the first STA is determined as an awake or doze state, and a PS mode of the second STA is determined a doze state. Since the unassigned TDD slot is not assigned to the second STA, the second STA (STA) is in the doze state, but the first STA (AP) may autonomously make a decision to become the awake state.

In the assigned Rx TDD slot, the PS mode of the first STA is determined as the awake state, and the PS mode of the second STA is determined as the awake state. In the assigned Rx TDD slot, the first STA (AP) has to send a signal to the second STA (STA), both the first and second STAs shall be in the awake state.

In the assigned Tx TDD slot, the PS mode of the first STA is determined as the awake state, and the PS mode of the second STA is determined as the awake or doze state.

If a signal to be transmitted by the second STA exists in the assigned Tx TDD slot, the PS mode of the second STA may be determined as the awake state, and the signal may be transmitted to the first STA in the assigned Tx TDD slot. If the signal to be transmitted by the second STA does not exist in the assigned Tx TDD slot, the PS mode of the second STA may be determined as the doze state. That is, since the second STA (STA) has to send a signal to the first STA (AP) in the assigned Tx TDD slot, the first STA shall be awake unconditionally. However, the second STA may become the awake state only if there is a signal to be sent, and may become the doze state if there is no signal to be sent.

In addition, the first STA may transmit a TDD slot schedule element from the second STA. The assigned Tx TDD slot and the assigned Rx TDD slot may be determined by the TDD slot schedule element. The PS mode may be determined after the TDD slot schedule element is received.

The beacon frame or the announce frame and the signal may be transmitted/received within a beacon interval. The beacon interval may include a beacon header interval (BHI) and a data transfer interval (DTI).

The BHI may include a beacon transmission interval (BTI), association beamforming training (A-BFT), and an announcement transmission interval (ATI). The DTI may include at least one contention based access period (CBAP) and the SP. The beacon frame may be transmitted in the BTI. The announce frame may be transmitted in the ATI. Beamforming training between the first STA and the second STA may be performed in the A-BFT.

If the beacon interval is in the awake state, in the BHI, the PS mode of the second STA may be determined as the awake or doze state, and the PS mode of the first STA may be determined as the awake state. In addition, in the A-BFT, the PS mode of the second STA may be determined as the awake or doze state, and the PS mode of the first STA may be determined as the awake state. In addition, in the ATI, the PS mode of the second STA may be determined as the awake state, and the PS mode of the first STA may be determined as the awake state.

If the beacon interval is in the doze state, in the BHI, the PS mode of the second STA may not be defined (N/A), and the PS mode of the first STA may be determined as the awake or doze state. In the A-BFT, the PS mode of the second STA may not be defined (N/A), and the PS mode of the first STA may be determined as the awake or doze state. In the ATI, the PS mode of the second STA may be determined as the awake state, and the PS mode of the first STA may be determined as the awake state.

Figure 25:
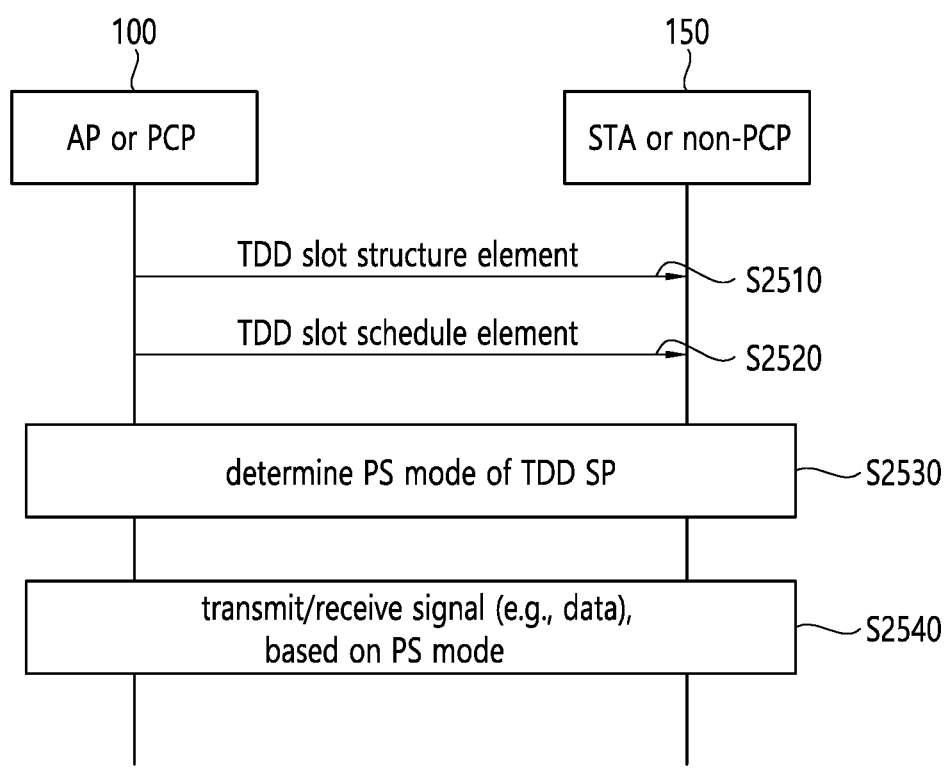
FIG. 25 shows a procedure of transmitting/receiving a signal based on a PS mode according to the present embodiment.

FIG. 25 shows a procedure of transmitting/receiving a signal based on a PS mode according to the present embodiment.

First, summarizing terminologies, a first STA may correspond to an initiator for performing beamforming, and a second STA may correspond to a responder for performing beamforming. In addition, the first STA may be a PCP 100, and the second STA may be a non-AP STA or non-PCP STA 150. MIMO beamforming described in the present embodiment is performed between the first STA and the second STA. In the presence of one second STA, single user (SU)-MIMO beamforming may be performed, and in the presence of a plurality of second STAs, multi-user (MU)-MIMO beamforming may be performed.

In step S2510, the AP transmits a TDD slot structure element to the STA. The AP may transmit a beacon frame or an announce frame to the STA. The beacon frame or the announce frame may include the TDD slot structure element. The plurality of TDD slots may be determined by the TDD slot structure element.

In step S2520, the AP transmits a TDD slot schedule element to the STA. An assigned Tx TDD slot and assigned Rx TDD slot to be described may be determined by the TDD slot schedule element. A PS mode may be determined after the TDD slot schedule element is received.

In step S2530, the AP determines the PS mode in a service period (SP) based on a time division duplex (TDD).

In step S2540, the AP transmits the signal to the STA or receives the signal from the STA based on the PS mode.

In the following description, the AP is referred to as the first STA, and the STA is referred to as the second STA.

The SP includes a plurality of TDD slots.

The plurality of TDD slots include an unassigned TDD slot, an assigned Tx TDD slot, and an assigned Rx TDD slot. That is, the signal is not transmitted/received in the unassigned TDD slot. The signal may be transmitted to the second STA in the assigned Rx TDD slot, and may be received from the second STA in the assigned Tx TDD slot.

In the unassigned TDD slot, a PS mode of the first STA is determined as an awake or doze state, and a PS mode of the second STA is determined a doze state. Since the unassigned TDD slot is not assigned to the second STA, the second STA (STA) is in the doze state, but the first STA (AP) may autonomously make a decision to become the awake state.

In the assigned Rx TDD slot, the PS mode of the first STA is determined as the awake state, and the PS mode of the second STA is determined as the awake state. In the assigned Rx TDD slot, the first STA (AP) has to send a signal to the second STA (STA), both the first and second STAs shall be in the awake state.

In the assigned Tx TDD slot, the PS mode of the first STA is determined as the awake state, and the PS mode of the second STA is determined as the awake or doze state.

If a signal to be transmitted by the second STA exists in the assigned Tx TDD slot, the PS mode of the second STA may be determined as the awake state, and the signal may be transmitted to the first STA in the assigned Tx TDD slot. If the signal to be transmitted by the second STA does not exist in the assigned Tx TDD slot, the PS mode of the second STA may be determined as the doze state. That is, since the second STA (STA) has to send a signal to the first STA (AP) in the assigned Tx TDD slot, the first STA shall be awake unconditionally. However, the second STA may become the awake state only if there is a signal to be sent, and may become the doze state if there is no signal to be sent.

The beacon frame or the announce frame and the signal may be transmitted/received within a beacon interval. The beacon interval may include a beacon header interval (BHI) and a data transfer interval (DTI).

The BHI may include a beacon transmission interval (BTI), association beamforming training (A-BFT), and an announcement transmission interval (ATI). The DTI may include at least one contention based access period (CBAP) and the SP. The beacon frame may be transmitted in the BTI. The announce frame may be transmitted in the ATI. Beamforming training between the first STA and the second STA may be performed in the A-BFT.

If the beacon interval is in the awake state, in the BHI, the PS mode of the second STA may be determined as the awake or doze state, and the PS mode of the first STA may be determined as the awake state. In addition, in the A-BFT, the PS mode of the second STA may be determined as the awake or doze state, and the PS mode of the first STA may be determined as the awake state. In addition, in the ATI, the PS mode of the second STA may be determined as the awake state, and the PS mode of the first STA may be determined as the awake state.

If the beacon interval is in the doze state, in the BHI, the PS mode of the second STA may not be defined (N/A), and the PS mode of the first STA may be determined as the awake or doze state. In the A-BFT, the PS mode of the second STA may not be defined (N/A), and the PS mode of the first STA may be determined as the awake or doze state. In the ATI, the PS mode of the second STA may be determined as the awake state, and the PS mode of the first STA may be determined as the awake state.

5. Device Configuration

Figure 26:
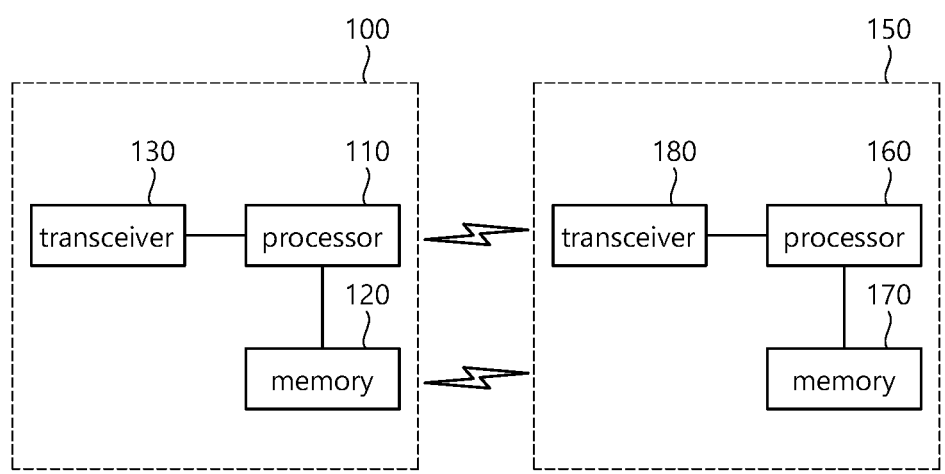
FIG. 26 is a diagram showing a device for implementing the above-described method.

FIG. 26 is a diagram illustrating a device for implementing the foregoing method.

A wireless device (100) of FIG. 26 may correspond to an initiator STA, which transmits a signal that is described in the description presented above, and a wireless device (150) may correspond to a responder STA, which receives a signal that is described in the description presented above. At this point, each station may correspond to a 11ay device (or user equipment (UE)) or a PCP/AP. Hereinafter, for simplicity in the description of the present invention, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement the functions, processes, and/or methods proposed in the present disclosure. For example, the processor (110, 160) may perform operations according to the foregoing embodiments.

The processor 110 of a transmitting device operates as follows. The processor 110 of the transmitting device determines the PS mode in a service period (SP) based on a time division duplex (TDD), and transmits a signal to the STA or receive a signal from the STA based on the PS mode.

The processor 160 of a receiving device operates as follows. The processor 610 of the receiving device determines the PS mode in a TDD-based SP, and transmits a signal to the AP or receives a signal from the AP based on the PS mode.

Figure 27:
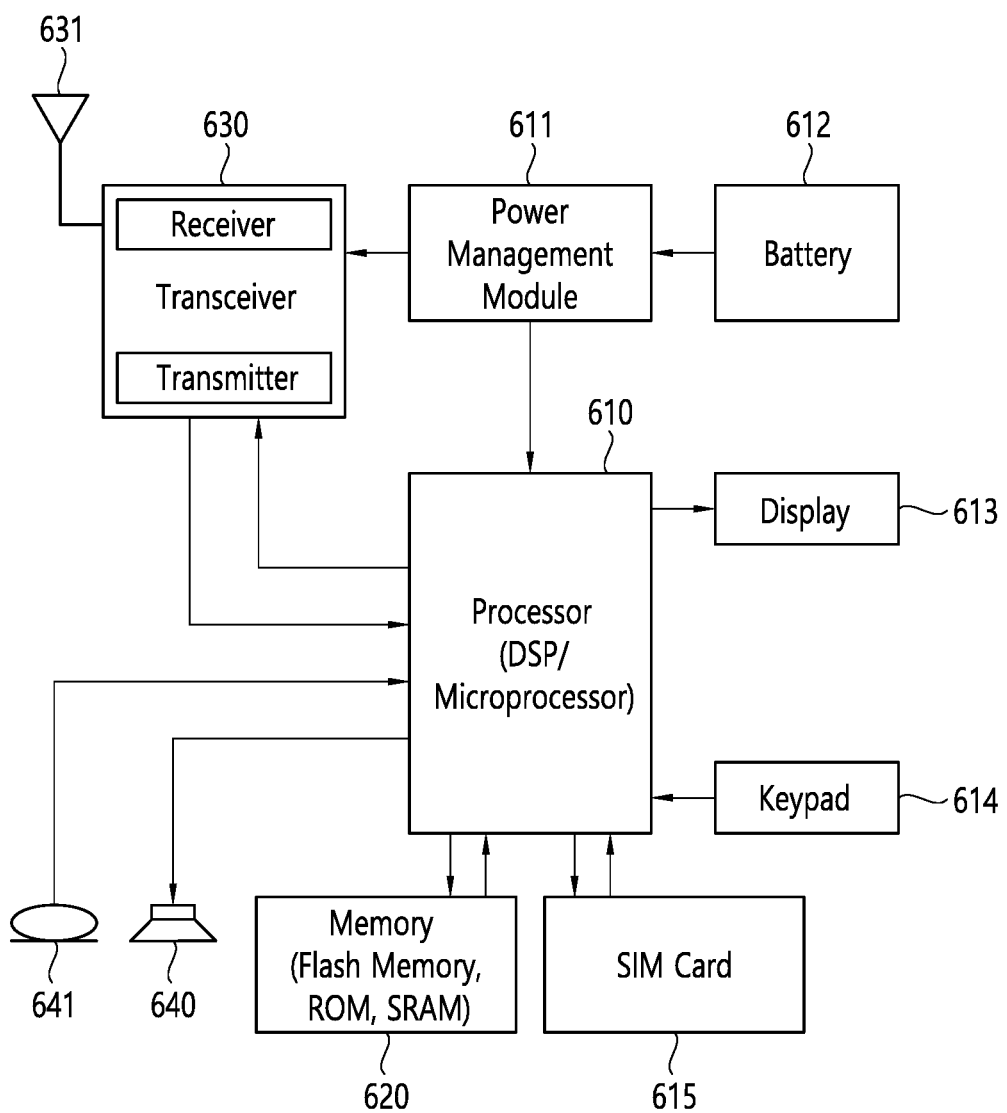
FIG. 27 shows a more detailed wireless device implementing an exemplary embodiment of the present invention.

FIG. 27 shows more detailed wireless device to implement an embodiment of the present invention. The present invention described above for the transmitting device or the receiving device may be applied to this embodiment.

A wireless device includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods described in this description. Layers of the radio interface protocol may be implemented in the processor 610. The processor 610 may include ASIC, other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In case of a transmitting device, the processor 610 determines the PS mode in a service period (SP) based on a time division duplex (TDD), and transmits a signal to the STA or receive a signal from the STA based on the PS mode.

In case of a receiving device, the processor 610 determines the PS mode in a TDD-based SP, and transmits a signal to the AP or receives a signal from the AP based on the PS mode.

In the following description, the STA is the first STA, and the SP is the second STA.

The SP includes a plurality of TDD slots.

The first STA may transmit a beacon frame or an announce frame to the second STA.

The beacon frame or the announce frame may include a TDD slot structure element. The plurality of TDD slots may be determined by the TDD slot structure element.

The plurality of TDD slots include an unassigned TDD slot, an assigned Tx TDD slot, and an assigned Rx TDD slot. That is, the signal is not transmitted/received in the unassigned TDD slot. The signal may be transmitted to the second STA in the assigned Rx TDD slot, and may be received from the second STA in the assigned Tx TDD slot.

In the unassigned TDD slot, a PS mode of the first STA is determined as an awake or doze state, and a PS mode of the second STA is determined as a doze state. Since the unassigned TDD slot is not assigned to the second STA, the second STA (STA) is in the doze state, but the first STA (AP) may autonomously make a decision to become the awake state.

In the assigned Rx TDD slot, the PS mode of the first STA is determined as the awake state, and the PS mode of the second STA is determined as the awake state. In the assigned Rx TDD slot, the first STA (AP) has to send a signal to the second STA (STA), both the first and second STAs shall be in the awake state.

In the assigned Tx TDD slot, the PS mode of the first STA is determined as the awake state, and the PS mode of the second STA is determined as the awake or doze state.

If a signal to be transmitted by the second STA exists in the assigned Tx TDD slot, the PS mode of the second STA may be determined as the awake state, and the signal may be transmitted to the first STA in the assigned Tx TDD slot. If the signal to be transmitted by the second STA does not exist in the assigned Tx TDD slot, the PS mode of the second STA may be determined as the doze state. That is, since the second STA (STA) has to send a signal to the first STA (AP) in the assigned Tx TDD slot, the first STA shall be awake unconditionally. However, the second STA may become the awake state only if there is a signal to be sent, and may become the doze state if there is no signal to be sent.

In addition, the first STA may transmit a TDD slot schedule element from the second STA. The assigned Tx TDD slot and the assigned Rx TDD slot may be determined by the TDD slot schedule element. The PS mode may be determined after the TDD slot schedule element is received.

The beacon frame or the announce frame and the signal may be transmitted/received within a beacon interval. The beacon interval may include a beacon header interval (BHI) and a data transfer interval (DTI).

The BHI may include a beacon transmission interval (BTI), association beamforming training (A-BFT), and an announcement transmission interval (ATI). The DTI may include at least one contention based access period (CBAP) and the SP. The beacon frame may be transmitted in the BTI. The announce frame may be transmitted in the ATI. Beamforming training between the first STA and the second STA may be performed in the A-BFT.

If the beacon interval is in the awake state, in the BHI, the PS mode of the second STA may be determined as the awake or doze state, and the PS mode of the first STA may be determined as the awake state. In addition, in the A-BFT, the PS mode of the second STA may be determined as the awake or doze state, and the PS mode of the first STA may be determined as the awake state. In addition, in the ATI, the PS mode of the second STA may be determined as the awake state, and the PS mode of the first STA may be determined as the awake state.

If the beacon interval is in the doze state, in the BHI, the PS mode of the second STA may not be defined (N/A), and the PS mode of the first STA may be determined as the awake or doze state. In the A-BFT, the PS mode of the second STA may not be defined (N/A), and the PS mode of the first STA may be determined as the awake or doze state. In the ATI, the PS mode of the second STA may be determined as the awake state, and the PS mode of the first STA may be determined as the awake state.

What is claimed is:

1. A method of transmitting or receiving a signal based on a power saving (PS) mode in a wireless local area network (WLAN) system, the method comprising:
 receiving, by a first station (STA), a beacon frame from a second STA;
 determining, by the first STA, the PS mode in a service period (SP) based on a time division duplex (TDD); and
 transmitting, by the first STA, the signal to the second STA or receiving the signal from the second STA based on the PS mode, wherein the beacon frame and the signal are transmitted/ received within a beacon interval, wherein the beacon interval includes a beacon header interval (BHI) and a data transfer interval (DTI), wherein the BHI includes a beacon transmission interval (BTI), association beamforming training (A-BFT), and an announcement transmission interval (ATI), wherein the SP includes a plurality of TDD slots, wherein the plurality of TDD slots include an unassigned TDD slot, an assigned Tx TDD slot, and an assigned Rx TDD slot, wherein, in the unassigned TDD slot, a PS mode of the first STA is determined as a doze state, and a PS mode of the second STA is determined an awake or doze state, wherein, in the assigned Rx TDD slot, the PS mode of the first STA is determined as the awake state, and the PS mode of the second STA is determined as the awake state, wherein, in the assigned Tx TDD slot, the PS mode of the first STA is determined as the awake or doze state, and the PS mode of the second STA is determined as the awake state, and wherein if the beacon interval is in the awake state,
in the BHI, the PS mode of the first STA is determined as the awake or doze state, and the PS mode of the second STA is determined as the awake state,
in the A-BFT, the PS mode of the first STA is determined as the awake or doze state, and the PS mode of the second STA is determined as the awake state, and
in the ATI, the PS mode of the first STA is determined as the awake state, and the PS mode of the second STA is determined as the awake state.

2. The method of claim 1,
wherein the signal is not transmitted or received in the unassigned TDD slot, and
wherein the signal is received from the second STA in the assigned Rx TDD slot.

3. The method of claim 1,
wherein if a signal to be transmitted by the first STA exists in the assigned Tx TDD slot, the PS mode of the first STA is determined as the awake state, and the signal is transmitted to the second STA in the assigned Tx TDD slot, and
wherein if the signal to be transmitted by the first STA does not exist in the assigned Tx TDD slot, the PS mode of the first STA is determined as the doze state.

4. The method of claim 1,
wherein the beacon frame or an announce frame includes a TDD slot structure element, and
wherein the plurality of TDD slots are determined by the TDD slot structure element.

5. The method of claim 1, further comprising receiving, by the first STA, a TDD slot schedule element from the second STA,
wherein the assigned Tx TDD slot and the assigned Rx TDD slot are determined by the TDD slot schedule element, and
wherein the PS mode is determined after the TDD slot schedule element is received.

6. The method of claim 4,
wherein the DTI includes at least one contention based access period (CBAP) and the SP,
wherein the beacon frame is transmitted in the BTI,
wherein the announce frame is transmitted in the ATI, and
wherein beamforming training between the first STA and the second STA is performed in the A-BFT.

7. The method of claim 6, wherein if the beacon interval is in the doze state,
in the BHI, the PS mode of the first STA is not defined, and the PS mode of the second STA is determined as the awake or doze state,
in the A-BFT, the PS mode of the first STA is not defined, and the PS mode of the second STA is determined as the awake or doze state, and
in the ATI, the PS mode of the first STA is determined as the awake state, and the PS mode of the second STA is determined as the awake state.

8. The method of claim 1,
wherein the first STA is a non-AP STA or a non-Personal basic service set Control Point (PCP), and
wherein the second STA is an AP or a PCP.

9. A first station (STA) for transmitting or receiving a signal based on a power saving (PS) mode in a wireless local area network (WLAN) system, the first STA comprising:
a memory;
a transceiver; and
a processor operatively coupled with the memory and the transceiver, wherein the processor is configured to:
receive a beacon frame from a second STA;
determine the PS mode in a service period (SP) based on a time division duplex (TDD); and
transmit the signal to the second STA or receiving the signal from the second STA based on the PS mode,
wherein the beacon frame and the signal are transmitted/ received within a beacon interval,
wherein the beacon interval includes a beacon header interval (BHI) and a data transfer interval (DTI),
wherein the BHI includes a beacon transmission interval (BTI), association beamforming training (A-BFT), and an announcement transmission interval (ATI),
wherein the SP includes a plurality of TDD slots,
wherein the plurality of TDD slots include an unassigned TDD slot, an assigned Tx TDD slot, and an assigned Rx TDD slot,
wherein, in the unassigned TDD slot, a PS mode of the first STA is determined as a doze state, and a PS mode of the second STA is determined an awake or doze state,
wherein, in the assigned Rx TDD slot, the PS mode of the first STA is determined as the awake state, and the PS mode of the second STA is determined as the awake state, and
wherein, in the assigned Tx TDD slot, the PS mode of the first STA is determined as the awake or doze state, and the PS mode of the second STA is determined as the awake state,
wherein if the beacon interval is in the awake state,
in the BHI, the PS mode of the first STA is determined as the awake or doze state, and the PS mode of the second STA is determined as the awake state,
in the A-BFT, the PS mode of the first STA is determined as the awake or doze state, and the PS mode of the second STA is determined as the awake state, and
in the ATI, the PS mode of the first STA is determined as the awake state, and the PS mode of the second STA is determined as the awake state.

10. The first STA of claim 9,
wherein the signal is not transmitted or received in the unassigned TDD slot, and wherein the signal is received from the second STA in the assigned Rx TDD slot.

11. The first STA of claim 9,
wherein if a signal to be transmitted by the first STA exists in the assigned Tx TDD slot, the PS mode of the first STA is determined as the awake state, and the signal is transmitted to the second STA in the assigned Tx TDD slot, and
wherein if the signal to be transmitted by the first STA does not exist in the assigned Tx TDD slot, the PS mode of the first STA is determined as the doze state.

12. The first STA of claim 9,
wherein the beacon frame or an announce frame includes a TDD slot structure element, and
wherein the plurality of TDD slots are determined by the TDD slot structure element.

13. The first STA of claim 9,
wherein the processor receives a TDD slot schedule element from the second STA,
wherein the assigned Tx TDD slot and the assigned Rx TDD slot are determined by the TDD slot schedule element, and
wherein the PS mode is determined after the TDD slot schedule element is received.

14. The first STA of claim 12,
wherein the DTI includes at least one contention based access period (CBAP) and the SP,
wherein the beacon frame is transmitted in the BTI,
wherein the announce frame is transmitted in the ATI, and
wherein beamforming training between the first STA and the second STA is performed in the A-BFT.

15. A method of transmitting or receiving a signal based on a power saving (PS) mode in a wireless local area network (WLAN) system, the method comprising:
receiving, by a first station (STA), a beacon frame from a second STA;
determining, by the first STA, the PS mode a service period (SP) based on a time division duplex (TDD); and
transmitting, by the first STA, the signal to the second STA or receiving the signal from the second STA based on the PS mode,
wherein the beacon frame and the signal are transmitted/received within a beacon interval,
wherein the beacon interval includes a beacon header interval (BHI) and a data transfer interval (DTI),
wherein the BHI includes a beacon transmission interval (BTI), association beamforming training (A-BFT), and an announcement transmission interval (ATI),
wherein the SP includes a plurality of TDD slots,
wherein the plurality of TDD slots include an unassigned TDD slot, an assigned Tx TDD slot, and an assigned Rx TDD slot,
wherein, in the unassigned TDD slot, a PS mode of the first STA is determined as an awake or doze state, and a PS mode of the second STA is determined as a doze state,
wherein, in the assigned Rx TDD slot, the PS mode of the first STA is determined as the awake state, and the PS mode of the second STA is determined as the awake state,
wherein, in the assigned Tx TDD slot, the PS mode of the first STA is determined as the awake state, and the PS mode of the second STA is determined as the awake or doze state,
wherein the first STA is an AP or a Personal basic service set Control Point (PCP),
wherein the second STA is a non-AP STA or a non-PCP STA, and
wherein if the beacon interval is in the awake state,
in the BHI, the PS mode of the first STA is determined as the awake or doze state, and the PS mode of the second STA is determined as the awake state,
in the A-BFT, the PS mode of the first STA is determined as the awake or doze state, and the PS mode of the second STA is determined as the awake state, and
in the ATI, the PS mode of the first STA is determined as the awake state, and the PS mode of the second STA is determined as the awake state.

* * * * *